(12) United States Patent
McClain

(10) Patent No.: US 8,369,833 B2
(45) Date of Patent: *Feb. 5, 2013

(54) SYSTEMS AND METHODS FOR PROVIDING AUTHENTICATION AND AUTHORIZATION UTILIZING A PERSONAL WIRELESS COMMUNICATION DEVICE

(75) Inventor: Fred McClain, Cardiff, CA (US)

(73) Assignee: Boojum Mobile, Cardiff, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/719,755

(22) Filed: Mar. 8, 2010

(65) Prior Publication Data

US 2010/0257357 A1 Oct. 7, 2010

Related U.S. Application Data

(63) Continuation of application No. 11/429,470, filed on May 5, 2006, now Pat. No. 7,697,920, which is a continuation of application No. 10/636,971, filed on Aug. 6, 2003, now abandoned.

(60) Provisional application No. 60/401,434, filed on Aug. 6, 2002.

(51) Int. Cl.
*H04M 1/66* (2006.01)
*H04M 1/68* (2006.01)
*H04M 3/16* (2006.01)

(52) U.S. Cl. ........................................ 455/411; 455/410

(58) Field of Classification Search .................. 455/410, 455/411; 713/1, 182

See application file for complete search history.

(56) References Cited

U.S. PATENT DOCUMENTS

| | | | |
|---|---|---|---|
| 5,668,876 A | 9/1997 | Falk et al. | |
| 5,956,636 A | 9/1999 | Lipsit | |
| 6,212,372 B1 | 4/2001 | Julin | |
| 6,430,407 B1 | 8/2002 | Turtiainen | |
| 6,650,888 B1 | 11/2003 | Cook | |
| 6,748,195 B1 | 6/2004 | Phillips | |
| 6,782,080 B2 | 8/2004 | Leivo et al. | |
| 6,799,032 B2 | 9/2004 | McDonnell et al. | |
| 6,807,558 B1 | 10/2004 | Hassett et al. | |
| 7,142,840 B1 | 11/2006 | Geddes et al. | |
| 2001/0005883 A1 | 6/2001 | Wray et al. | |
| 2002/0052968 A1* | 5/2002 | Bonefas et al. | ............ 709/231 |
| 2003/0055738 A1 | 3/2003 | Alie | |
| 2003/0114192 A1 | 6/2003 | Estes et al. | |

(Continued)

FOREIGN PATENT DOCUMENTS

EP 1328103 A 7/2003
WO 0154438 A 7/2001

(Continued)

OTHER PUBLICATIONS

Knechtel, Harry and Rifant, Omar "PKI Goes Mobile" Technofile, p. 30-31 (2001).

(Continued)

*Primary Examiner* — Nathan Mitchell
(74) *Attorney, Agent, or Firm* — Cooley, LLP

(57) ABSTRACT

An authorization and authentication system utilizing a mobile communication device. The authentication and authorization system enables a trusted server, in conjunction with a user controlled mobile communication device (which has been registered with the trusted site), to authorize a transaction carried out at a transaction management system. An identity of the user is authenticated by a verification that the user is in possession of the mobile communication device. In this way, the transaction management system is able to effectuate an authorized transaction with confidence that the authorization was from the user and not a third party. In variations, the authentication is a multi-factor authentication, i.e., the user must both possess the mobile communication device and information, e.g., a password.

22 Claims, 12 Drawing Sheets

U.S. PATENT DOCUMENTS

2003/0135762 A1* 7/2003 Macaulay ............... 713/201
2006/0050680 A1 3/2006 Naim et al.

FOREIGN PATENT DOCUMENTS

WO 0182242 A2 11/2001
WO 0201516 A2 1/2002

OTHER PUBLICATIONS

PCT/US2004/025496 International Search Report, IPRP and Written Opinion mailed Mar. 7, 2005. (incorrect issue Nov. 24, 2004—corrected 05').
Redpay Consulting, "Mobile Banking Implementation Issues," Doc. No. Jhb-0001-WP, Issue C (Sep. 8, 2002).
U.S. Appl. No. 10/636,971 Non-Final Office Action mailed Jun. 28, 2005.
U.S. Appl. No. 10/636,971 Non-Final Office Action mailed Jan. 25, 2006.
U.S. Appl. No. 10/636,971 Final Office Action mailed Jul. 17, 2006.
U.S. Appl. No. 10/636,971 Non-Final Office Action mailed Aug. 22, 2007.
U.S. Appl. No. 10/636,971 Non-Final Office Action mailed Jan. 24, 2008.
U.S. Appl. No. 11/429,470 Non-Final Office Action mailed Oct. 9, 2007.
U.S. Appl. No. 11/429,470 Non-Final Office Action mailed Apr. 28, 2009.

* cited by examiner

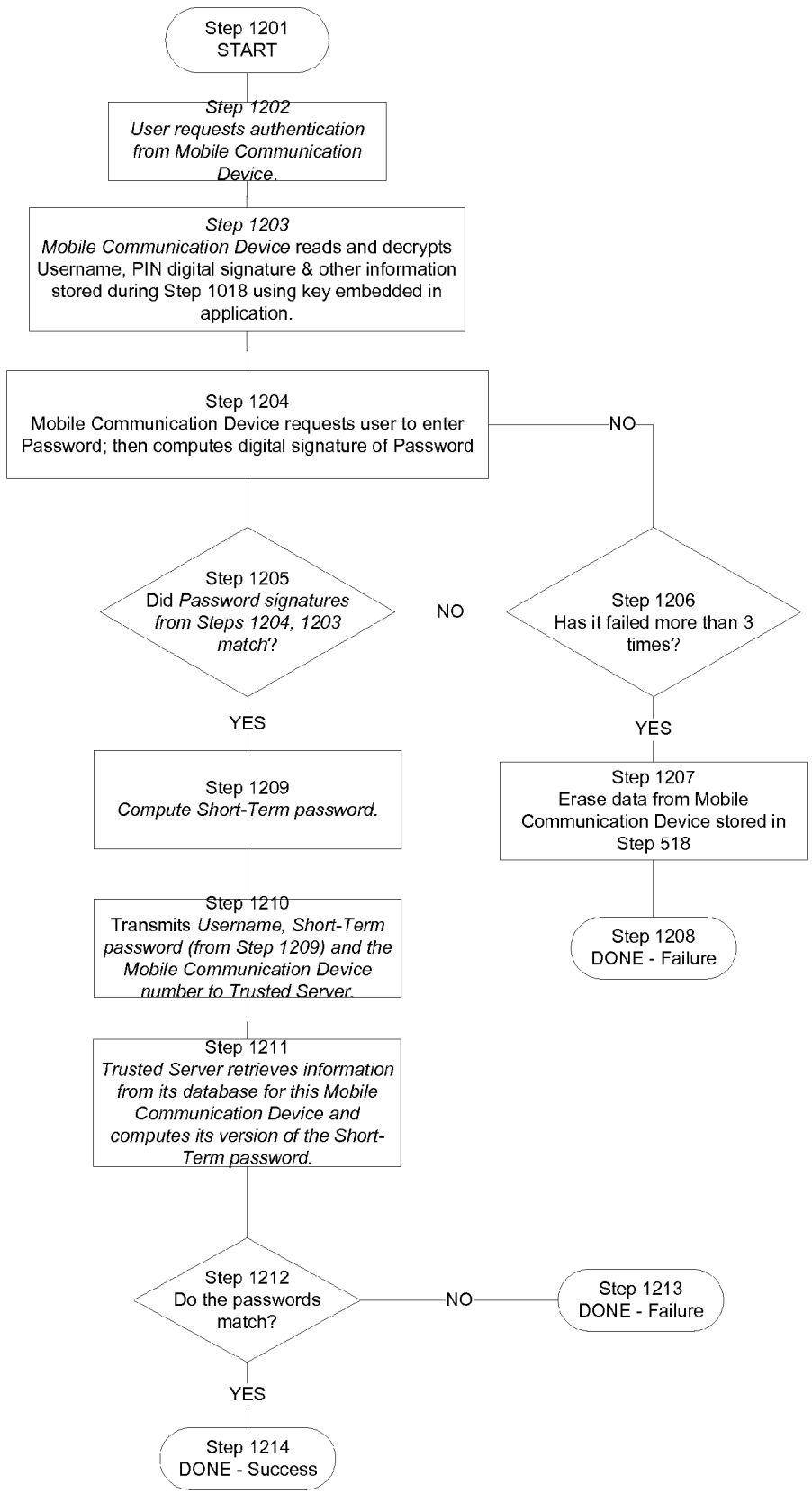
Figure 12 - User Authentication Logic Flow

SYSTEMS AND METHODS FOR PROVIDING AUTHENTICATION AND AUTHORIZATION UTILIZING A PERSONAL WIRELESS COMMUNICATION DEVICE

CROSS-REFERENCE TO RELATED APPLICATIONS

This application is a continuation of U.S. patent application Ser. No. 11/429,470, entitled SYSTEM AND METHOD FOR PROVIDING AUTHENTICATION AND AUTHORIZATION UTILIZING A PERSONAL WIRELESS COMMUNICATION DEVICE, filed on May 5, 2006 now U.S. Pat No. 7,697,920, which is a continuation of U.S. patent application Ser. No. 10/636,971, entitled SYSTEM AND METHOD FOR PROVIDING AUTHENTICATION AND AUTHORIZATION UTILIZING A PERSONAL WIRELESS COMMUNICATION DEVICE, filed on Aug. 6, 2003 now abandoned, which claims priority to U.S. Patent Application Ser. No. 60/401,434, entitled SYSTEM AND METHOD FOR PROVIDING AUTHENTICATION AND AUTHORIZATION UTILIZING A PERSONAL WIRELESS DIGITAL COMMUNICATION DEVICE, filed on Aug. 6, 2002. The content of each of these applications is hereby incorporated by reference herein in its entirety for all purposes.

BACKGROUND

1. Field of the Invention

The present invention relates to information security devices, and more particularly to a system and method of providing a secure system for authentication and authorization utilizing a personal wireless digital communications device.

2. Discussion of Related Art

As computers have become more tightly integrated with a broad spectrum of our daily personal and business lives, there is a growing need for secure authentication and authorization of our interactions with them. Today's methods are cumbersome, expensive and inadequate. In certain cases, users are forced to carry specialized devices, learn a host of mechanisms and possibly memorize scores of username and password combinations. In practice, providers are forced to either accept lower levels of security or to install expensive special-purpose security systems. Often the actual level of security is not nearly what is promised, because in order to simply be able to use the systems users resort to insecure storage of their usernames and passwords, whether on pieces of paper or in insecure digital documents.

Access to these systems and services is most often secured without the use of dedicated security devices through a simple challenge-response dialog presented over the same data path over which the primary interaction occurs. Typically the data path consists of a keyboard, mouse and monitor; and the challenge-response dialog initiated by a secured program is often in the form of a request for a "username/password" pair. The secured program then compares the password as entered by the user during the current session with one associated to the provided username in a previous session. The requested degree of access to the secured program or service is granted if the two passwords match, and denied if they do not.

To provide additional security, special-purpose credit card-sized devices with internal microprocessors, non-volatile memory and sometimes a keypad for data entry are utilized. These devices contain a unique identifier—stored in the non-volatile memory—along with personal cryptographic keys. They are issued to a user with a personal access code, commonly known as a Personal Identification Number ("PIN"). The user must present a correct PIN to the card—or to a device which reads the card—to unlock the card for operation. Once unlocked, the card may facilitate a variety of challenge-response dialogs can be used to authenticate and authorized transactions.

This approach presents several disadvantages. First, these special purpose security devices add complexity and cost. Second, they place the additional burden on the user to have the security device with them when they need access to the computer system. Third, the limited computing power and limited programmability of these devices makes it difficult to incorporate flexible challenge-response dialogs. Fourth, since the data paths between the user and the security device and between the security device and the computing system consist of keyboard entry, it is not possible to incorporate additional systems into the challenge-response dialog. Fifth, since there is little standardization, one user may be obliged to carry multiple devices for different purposes, and to remember the PIN for each.

Accordingly, a need exists for a secure, convenient, elegant and cost-effective method and apparatus for authentication and authorization. When being employed to facilitate authentication and authorization of one or more application programs executed on a host computer, such a technique will desirably be capable of implementation substantially independently from the host computer so as to maximize protection against unauthorized access.

SUMMARY

In one aspect, the present invention relates to a method for authenticating a user in a wireless communications system, comprising receiving an address of a wireless communication device at a trusted server, wherein the address identifies the wireless communication device in a communications network, locating the address of the wireless communication device among a plurality of addresses in a database, wherein the user is associated with the address in the database, establishing, in response to the locating the address, a wireless communication link with the wireless communication device, receiving identifying information from the wireless communication device over a communication path including the wireless communication link, wherein the identifying information is produced, at least in part, from shared information stored in a user programmable memory of the wireless communication device and the shared information includes a shared secret generated via a cryptographic key exchange between the wireless communication device and the trusted server and authenticating the user in response to the identifying information.

In another aspect, the present invention relates to a system for authenticating a user in a wireless communications system, comprising a trusted computer server disposed for communicating with a plurality of wireless communications devices in a communications network including one or more wireless communications links, including: one or more processors and one or more memories, said one or more memories including instructions for execution on the one or more processors to: receive an address of a first wireless communication device of the plurality of wireless communications devices, wherein the address identifies the wireless communication device in a communications network, locate the address of the wireless communication device among a plurality of addresses in a database, wherein the user is associated with the address in the database, initiate establishment, in response to the locating the address, a wireless communication link with the wireless communication device, receive identifying information from the wireless communication device over a communication path including the one or more wireless communication links, wherein the identifying information is produced, at least in part, from shared information stored in a user programmable memory of the wireless communication device and the shared information includes a shared secret generated via a cryptographic key exchange between the wireless communication device and the trusted server and authenticate the user in response to the identifying information.

Additional aspects of the present invention are further described below in conjunction with the appended drawings.

BRIEF DESCRIPTION OF THE DRAWINGS

The above and other aspects, features and advantages of the present invention will be more apparent from the following more particular description thereof, presented in conjunction with the following drawings wherein:

Other features and advantages of the present invention will be apparent from the following detailed description of the drawing, in which

FIG. 12 is a flowchart illustrating steps carried out during an authentication/authorization phase by the trusted server of FIGS. 1 and 5, the mobile communication device of FIGS. 1, 2, and 5 and the transaction management system of FIGS. 1 and 5.

Corresponding reference characters indicate corresponding components throughout the several views of the drawings.

DETAILED DESCRIPTION OF EMBODIMENTS

Figure 1:
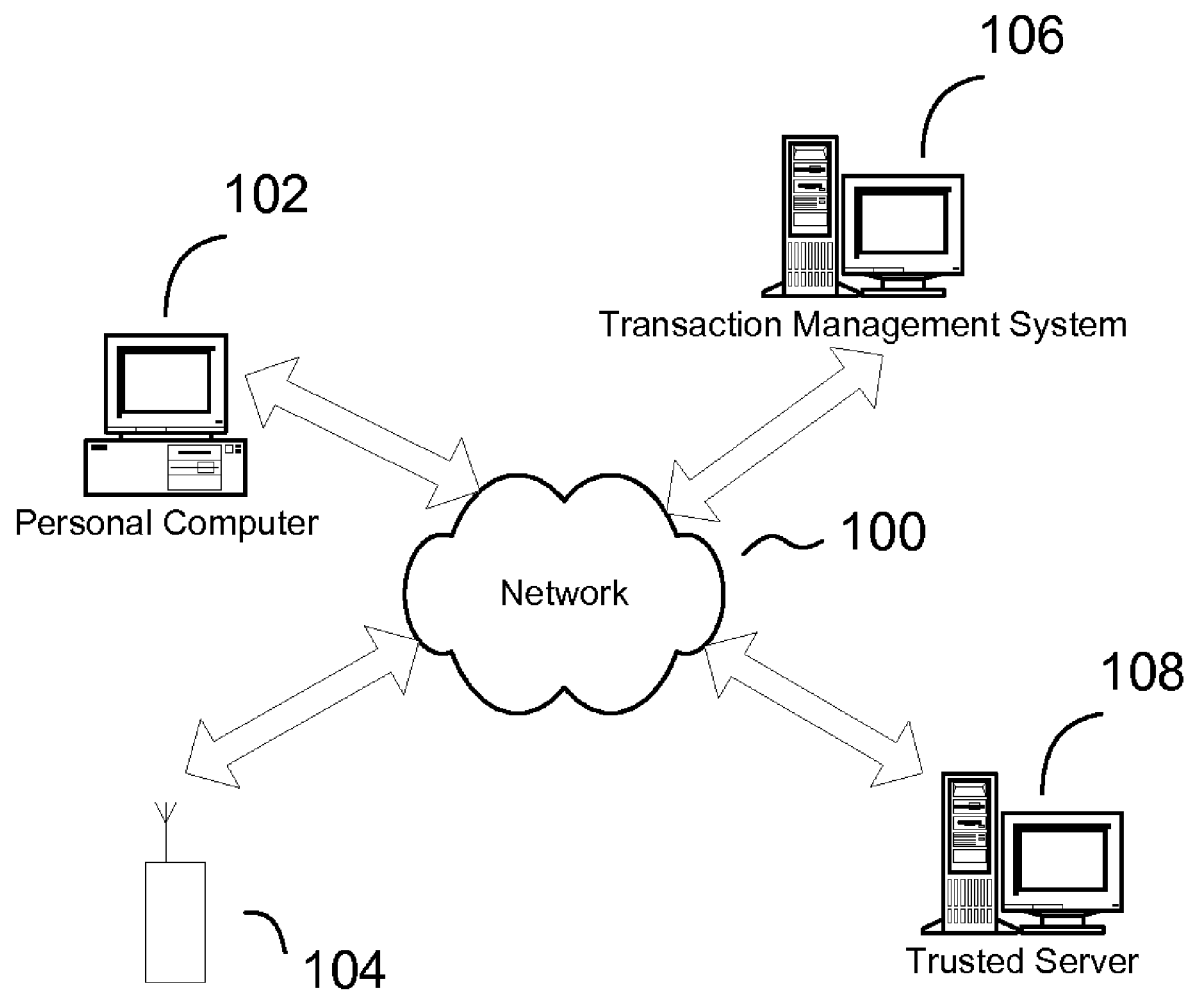
FIG. 1 is an overview of the physical environment for one embodiment of the present invention.

The following description is not to be taken in a limiting sense, but is made merely for the purpose of describing the general principles of the invention. The scope of the invention should be determined with reference to the claims.

According to several embodiments, the present invention provides a user managed, authorization and authentication system utilizing a mobile communication device. The authentication and authorization system in several embodiments enables a trusted server, in conjunction with a user controlled mobile communication device (which has been registered with the trusted site), to authorize a transaction carried out at a transaction management system. In several embodiments, an identity of the user is authenticated by a verification that the user is in possession of the mobile communication device. In this way, the transaction management system is able to effectuate an authorized transaction with confidence that the authorization was from the user and not a third party. In some embodiments, the authentication is a multi-factor authentication, i.e., the user must both possess the mobile communication device and information, e.g., a password.

Beneficially, the authentication aspects of the present invention allow the user to be authenticated, and then based upon the authentication, the user is granted access to a secure resource, e.g., a secure server or a "brick and mortar" building. In other aspects of the present invention, the authentication aspects of the present invention allow the user to be authenticated, and then based upon the authentication, the user is able to authorize completion of a transaction, e.g., a transfer of money and/or a purchase.

Advantageously, according to several embodiments, the user is provided control over security information used during authentication of the user. In some embodiments the security information used to authenticate the user is stored in a user programmable memory of the mobile communication device. In these embodiments, the user is able to establish one set of security credentials for one trusted server, and another set of security credentials for another trusted server, and then store both sets of credentials in user programmable memory of the mobile communication device. Furthermore, the user may destroy the credentials at the user's discretion, and create a new set of credentials, with new information, e.g. a new password. Other systems, which utilize Hardware Security Modules (HSM) or Security Identity Modules (SIM), e.g., cannot provide this type of flexibility because security information in these HSM/SIM based systems cannot be modified by the user.

Another beneficial aspect of the invention is the ability of the mobile communication device to destroy credentials stored in the user programmable memory when an unauthorized user fails to enter the correct password upon request. Again, systems using HSM/SIM technology cannot simply destroy security information at the mobile communication device because information in the HSM/SIM modules, by design, is inaccessible and unalterable by a user.

Referring to FIG. 1, shown is an overview of the physical environment for one embodiment of the present invention. As shown in FIG. 1, a network 100 is seen to facilitate communication between and among a personal computer 102, a mobile communication device 104, a transaction management system 106 and a trusted server 108.

In several embodiments, the network 100 represents a combination of a variety of networks that allow the user personal computer 102, the mobile communication device 104, the transaction management system 106 and the trusted server 108 to intercommunicate. The network 100 may include, for example, a cellular communication network, a plain old telephone (POTS) network, a combination of one or more wide area and local area networks and the Internet. One of ordinary skill in the art will appreciate that there are innumerable ways, well within the scope of the present invention, of assembling the network 100 to provide intercommunication paths between the user personal computer 102, the mobile communication device 104, the transaction management system 106, and the trusted server 108. Although the personal computer 102, the mobile communication device 104, the transaction management system 106 and the trusted server 110 are all shown coupled to the network, it should be recognized that in several embodiments there is not direct communication between them.

The mobile communication device 104 according to several embodiments is a mobile communication device that is assigned to the user, i.e., it is associated with the user at the trusted server 108, it is small enough for the user to have in their possession and is capable of wireless digital communication with the trusted server 108. In several embodiments, the mobile communication device is equipped and configured to execute a challenge/response dialog to verify the user is in possession of their assigned mobile communication device 104. The Intranet and/or Internet communication are utilized for communications, according to some embodiments, between the mobile communication device 104 and trusted server 108, and between the trusted server 108 and the transaction management system 106, but this is certainly not required.

In one embodiment, the mobile communication device 104 is a digital cell phone equipped with a programmable processor, user input(s) (e.g., a keypad, microphone and/or biometric scanners), memory and wireless radio. In other embodiments, the mobile communication device 104 is a personal digital assistant equipped with a programmable processor, touch screen, memory and wireless radio.

One of ordinary skill in the art will appreciate that the mobile communication device 104 may be implemented by other devices that have the ability to take input from the user, e.g., via a keypad and/or microphone, processing capability, memory and communication functionality. When used herein, the term "cell phone" is used for exemplary purposes only, and it should be understood that the cell phone is simply one of a class of personal wireless communication devices that are useful for the purposes of the current invention.

The mobile communication device 104 according to several embodiments has an address associated with it. In the case of a cell phone, the address in one embodiment is the cell phone number. In other embodiments, the mobile communication address may be, without limitation, an electronic serial number (ESN), an Internet Protocol (IP) address or a medium access control (MAC) address. Thus, as used herein, the term mobile communication address includes, without limitation, an electronic serial number (ESN), an Internet Protocol (IP) address or a medium access control (MAC) address In several embodiments, a user is in close proximity with both the user personal computer and the mobile communication device 104, but this is by no means required, and in several embodiments of the present invention, the user is able to travel without regard to the location of the personal computer 102.

Also shown is a transaction management system 106, which according to several embodiments, controls a resource the user wishes to access. In other embodiments, the transaction management system 106 is associated with, e.g., manages, a transaction and is in communication with a user so the user has an option of authorizing a completion of the transaction. For simplicity, only one transaction management system is shown in FIG. 1, but it should be recognized that, in several embodiments, there are several transaction management systems 106.

The trusted server 108 generally functions to verify, for the transaction management system 106, that the mobile communication device 104 is with the user. In several embodiments the transaction management system 106 and the trusted server 108 are independent systems. In other embodiments the transaction management system 106 and the trusted server 108 are under the control of a single administrative entity, e.g., control of a single corporate entity, and in one embodiment the transaction management system 106 and the trusted server 108 are running on the same physical processing system.

Beneficially, a user is able to enter and update their personal information in a single location (i.e., the trusted server 108) and not have to re-enter this information for each transaction management system 106. Additionally, the authentication/authorization method in several embodiments allows the user to change the address of their mobile communication device 104 at the trusted server 108 without affecting authentication/authorization steps, which are described further herein with reference to FIGS. 6, 8, 9 and 12. Beneficially, in several embodiments, the user need not inform the transaction management system 106 of the change in address. That is, the user simply enters their new address, e.g., cell phone number, for the mobile communication device 104, and the trusted server 108 responds accordingly to update the address of the user's mobile communication device 104 in a database of the trusted server 108. If the user (or someone else) enters an old-address of the mobile communication device 104, the trusted server 108 will not authenticate the user for the transaction management system 106.

In operation according to one embodiment, the user requests access to a resource controlled by the transaction management system 106 through the user personal computer 102. In other embodiments, the request for access is made through other mechanisms that allow the user to identify themselves to the transaction management system 102. It should be recognized that a communication path between the mobile communication device 104 and the transaction management system 106 does not need to be the Internet or utilize Internet protocols. In some embodiments for example, a communication between the user and transaction management system 106 is as simple as pushing a button on a device, e.g., a keypad, which is in communication with the transaction management system 106.

In one embodiment for example, when a user desires to enter a locked building, the user enters a code into a keypad at a physical door that has a lock controlled by the transaction management system 106, and the transaction management system 106 communicates with the trusted server 108. The trusted server 108 then verifies the user is in possession of the mobile communication device 104 and provides an authentication to the transaction management system 106, which then allows the user to access a controlled resource, e.g., an inside of the building.

Similarly, as discussed further herein, the authentication/authorization method is used to control electronic payments to a vending machine or fast-food restaurant, or innumerable other applications. In one embodiment, for example, the transaction management system 106 is operated by a corporate entity, and the user is an officer of the corporate entity. In this embodiment, others in the corporate entity are able to request an approval for a transaction from the user/officer via the mobile communication device 104, and the user/officer is able to authorize the transaction, via the mobile communication device 104 from a remote location. Advantageously, the authentication aspects of the present invention allow the corporate entity to be substantially certain that the officer is in possession of the mobile communication device.

The following exemplary embodiments provide further insight into advantages of the present invention.

User Experience #1: Commercial Web Site

In one embodiment, the user is at the personal computer 102, and the transaction management system 106 is a commercial web site, e.g., Amazon.com®, which the user wishes to create an account with. Rather than having to fill out extensive forms with billing address, shipping address, and credit card information, and then later having to remember a username and password combination that is specific for the commercial web site, the user merely provides the address of the mobile communication device 104 to the commercial web site via the personal computer 102. In some embodiments, the user enters nothing more.

A few moments later, a communication link is established between the trusted server 108, and the mobile communication device 104. The mobile communication device 104 then alerts the user and presents a message. In some embodiments the communication link is established when the mobile communication device 104 is alerted from the trusted server 108, and in other embodiments, the communication link is established after the user checks in with the trusted server 108. The message reads, "Amazon wishes to authenticate your login. Please enter your password." The user then enters their password in to the mobile communication device 104. On the personal computer 102 the transaction management system 106 opens the user's account page with information about the user already filled into a form. The information about the user is information relevant to completing the transaction (e.g., credit card information, a physical address for the user, the user's name and potentially other information). The user simply confirms his wish (e.g., by using the personal computer 102) with the transaction management system 106, e.g., a server operated by Amazon.com® to open an account with this information.

Later, when the user wishes to come back and use his account, the user simply enters the address of his mobile communication device 104, and again, the mobile communication device 104 requests the user for their password, PIN or other information, after which the transaction management system 106 grants the user access to his account via personal computer 102.

In this example, the user is using the mobile communication device 104 as a unique identifier as well as an authentication device. When the user is a new customer and the user enters the address or telephone number of the mobile communication device 104 at a website, hosted by the transaction management system 106, the transaction management system contacts the trusted server 108 with the address or telephone number. The trusted server 108, according to one embodiment, sends an encrypted message to the user's mobile communication device 104, prompting a password request at the mobile communication device 104. The mobile communication device 104 accepts the user's entered password and sends identifying information back to the trusted server 104. Upon verifying the user has possession of the mobile communication device 104 based on the password, the trusted server 108 forwards a report to the transaction management system 106 indicating that the user is valid, and also sends the user's billing and shipping addresses. This allows automatic population of the form generated by the transaction management system 106 and the form is displayed to the user via the personal computer 102.

When the user returns to the web site hosted by the transaction management system 106, e.g., Amazon.com®, to make another purchase, the user only needs to enter the address or telephone number of the mobile communication device 104. The system 106 then again sends this address or telephone number to the trusted site 108. After authentication, the trusted site 108 identifies the user to the transaction management system 106, and the transaction management system 106 in turn allows the user to access their account.

User Experience #2: Building Entry

In this case the user is assumed to be an employee of a corporation (e.g., Xcorp Inc.) that needs to access a secure building after hours. Rather than having to carry a single-purpose security card, the user simply brings their mobile communication device 104, e.g., a cell phone. The user keys in the address of the mobile communication device, e.g., the cell phone number, into the keypad at the door.

A few moments later, the user is automatically alerted or checks in with the trusted server 108 using their mobile communication device 104, e.g., cell phone, and is alerted with a message. The message reads, "Building 15 entry security. Please enter your password." The user enters their password on the mobile communication device 104, e.g., the cell phone. The door buzzes him in.

Again, in this example embodiment, the address of the mobile communication device 104, e.g., the cell phone number, is information which the trusted server 108 uses to identify the user. The user enters it on the keypad at the door, which connects to a server in Xcorp's IS group, which forwards it to the trusted server authentication. Following password authentication, the trusted server 108 validates the user, sends his identity to Xcorp, and Xcorp's system opens the door.

User Experience #3: Remote Email

In this example, the user is again an employee of a corporation (e.g., Ycorp Inc.), but is in attendance at a remote meeting at another company and wishes to access secure corporate email from a computer behind the other company's firewall. The user connects to the transaction management system 106, which in this embodiment is a gatekeeper website for Ycorp Inc., and enters an address of their mobile communication device 104 (e.g., an Internet or other address).

The gatekeeper website then contacts the trusted site 108, and a few moments later, communications between the trusted server and the mobile communication device 104 are established. The user is then presented with a message, which reads, "Ycorp webmail secure login. Please enter your password." The user enters their password at the mobile communication device 104, e.g., via keypad or voice command. The user is then shown a secure web page via personal computer 102 that displays the user's email.

In one embodiment, the user connects from any computer to an HTTPS web site in his company. The user enters only the address of their mobile communication device 104, e.g., an address of their personal digital assistant, and the web site contacts the trusted server 108 with, e.g., the address of the personal digital assistant. Following authentication, the trusted server 108 securely identifies the user to Ycorp, and Ycorp allows the user to access their email.

User Experience #4: Virtual Private Network (VPN)

The user in this example is a Zcorp Inc. corporate worker in a hotel with a laptop, and the user wishes to access the Zcorp internal network using a VPN (Virtual Private Network). The user's mobile communication device 104 in this embodiment is a cell phone, and rather than having to carry a smart card and type in a currently valid code (as presented on the card), along with a username and password, the worker simply enters a cell phone number as requested in the laptop.

In this embodiment the transaction management system 106 is assumed to be operated by a company of which the user is an employee, and the user is using specialized software on their laptop to connect to the company securely via a VPN. In the connection process, the user enters their cell phone number in their laptop as an identifier, which is received by the system 106 and forwarded to the trusted site 108. The trusted site 108 receives the cell phone number, and then identifies the user and a connection is established between the trusted site 108 and the cell phone.

A few moments later, a communication link is established between the cell phone and the trusted server 108, and the worker is presented with a message, which reads: "Zcorp remote login. Please enter your password." The user enters their password, is authenticated by the trusted server 108, and then the user is connected into the Zcorp network with their laptop.

All of these examples have in common the need for authentication and authorization that is easy to use, inexpensive, and sufficiently secure for each purpose. The present invention according to several embodiments will apply to all four cases and many others. In the corporate world, because one corporation may have many different requirements for controlled and secure access, whether to physical spaces or to information, having a unified technology for addressing all of these, and one that uses a tool that many employees already carry (e.g., a cell phone and/or a PDA) may enable dramatic cost savings for large companies.

Figure 2:
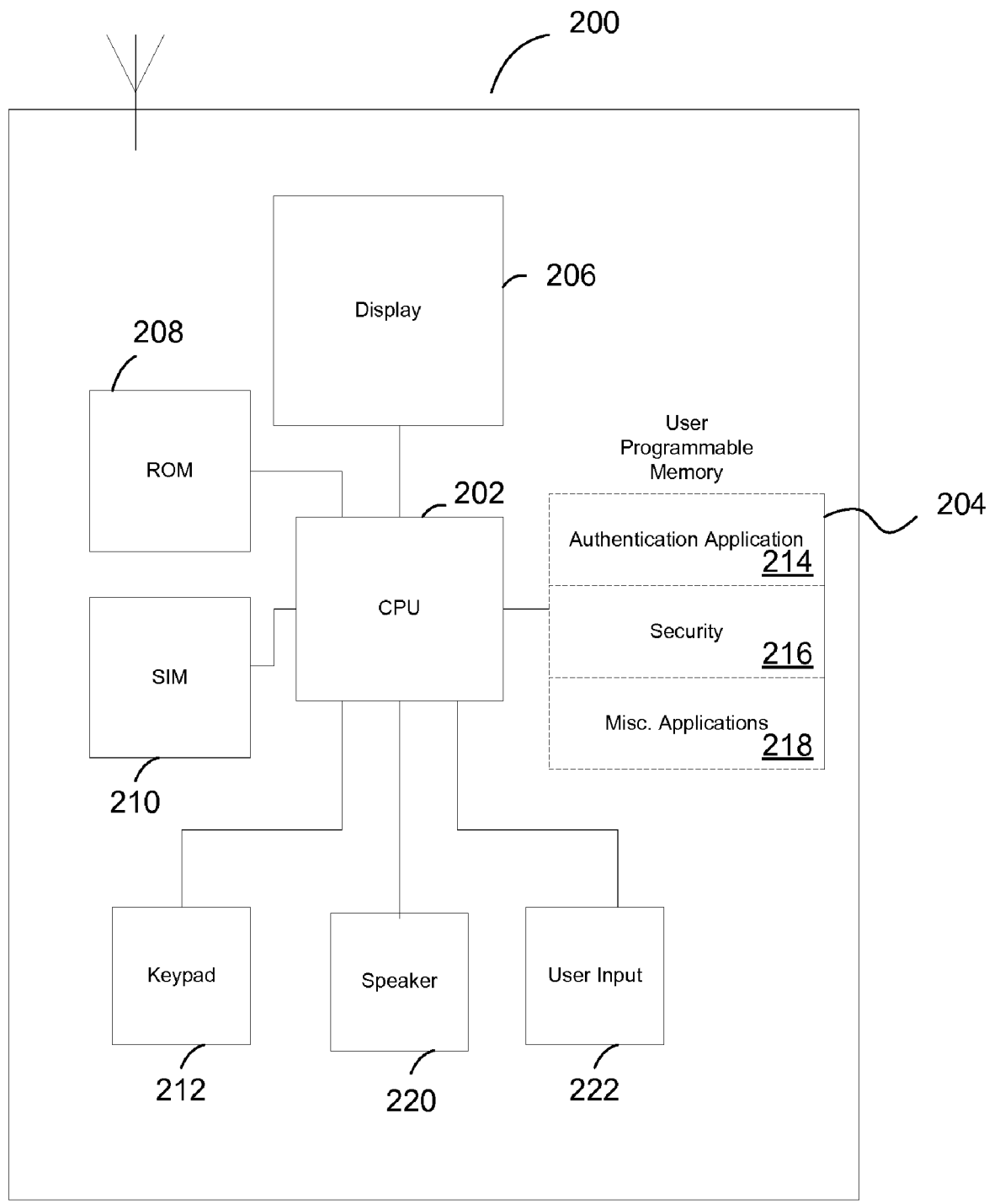
FIG. 2 is a block diagram of one embodiment of the mobile communications device of FIG. 1.

Referring next to FIG. 2, shown is a block diagram of one embodiment of the mobile communication device of FIG. 1. Shown in the mobile communication device 200 is a CPU 202 and coupled to the CPU 202 are a user programmable memory 204, a display 206, a read only memory (ROM) portion 208, a security identity module (SIM) 210, a keypad 212, a speaker 220, and a user input portion 222. Within the user programmable memory 204 is an authentication application 214, a security portion 216 and a miscellaneous applications portion 218.

According to several embodiments of the present invention, the authentication application 214 includes instructions that are carried out by the CPU 202 in performing both initialization and authorization/authentication procedures described further herein. In one embodiment, the authentication application 214 is down loaded via an air link to the mobile communication device 200, but this is certainly not required, and in other embodiments, the authentication application 214 may be downloaded via wired coupling.

In other embodiments, the authentication application 214 is only responsible for initialization (and re-initialization) of user identification and associated security information stored on the mobile communication device 200.

Also shown in the user programmable memory 204 is a security portion 216, which according to several embodiments stores information, which the authentication application 214 utilizes to verify that a person using the mobile communication device 200 is an authorized user. In several embodiments, information derived from information shared with the trusted server 108, e.g., a "shared secret" and/or a representation of a password is stored in the security portion 216. It should be recognized that although information is "shared," during initialization, in some embodiments, the shared information is not passed between the mobile communication device 200 and the trusted server 108. During authentication, identifying information produced from the information stored in the security portion 216 is sent to the trusted server 108, and is utilized by the trusted server 108 to authenticate the user.

Also shown within the user programmable memory 204 is a miscellaneous application portion 218, which includes other applications, e.g., a web browser, a day-timer application and other applications. In some embodiments, at least a portion of the applications in the miscellaneous portion 218 interact with the authentication application 214 to gain access to resources controlled by the transaction management system 106.

The user input portion 222, in one embodiment includes a microphone for receiving a user's voice as an input. In another embodiment, the user input portion 222 includes a biometric scanning device, e.g., a retinal scanner or a thumb print scanner.

Figure 3:
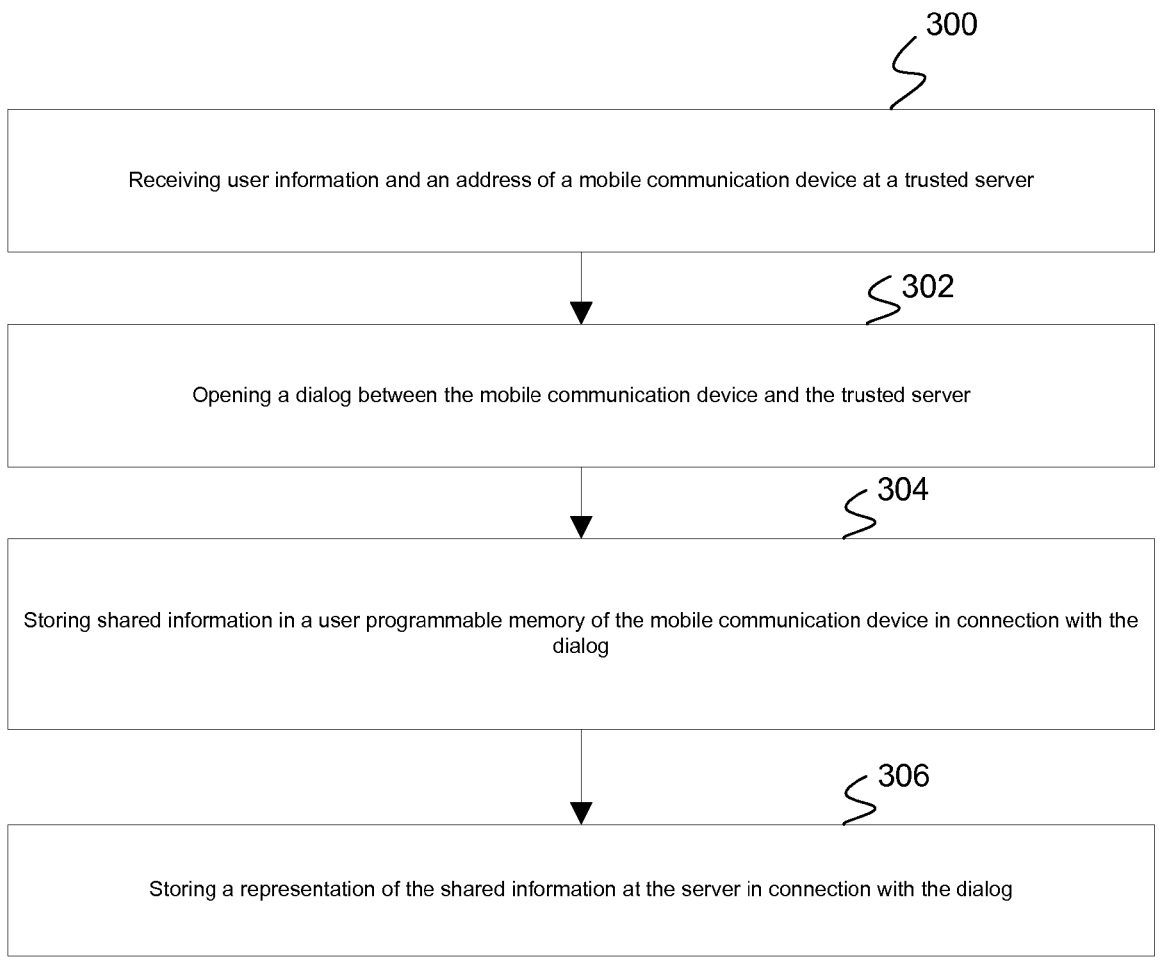
FIG. 3 is a flowchart depicting one implementation of steps carried out during initialization of the mobile communication device 200 according to several embodiments of the present invention.

While referring to FIG. 2, simultaneous reference will be made to FIG. 3, which is a flowchart depicting steps carried out during initialization of the mobile communication device 200 according to several embodiments of the present invention.

Initially, user information and an address of the mobile communication device 200 are received at the trusted server 108 (Step 300). In several embodiments, user information includes personal information, which may comprise, without limitation, a password, a user's name, address, credit card billing information and other information.

In some embodiments, the password is a user-derived password, and in other embodiments, the password is part of the personal information, e.g., a birth date of the user. In yet other embodiments, a password is generated for the user at the trusted server 108. The password in some embodiments is a string of characters, e.g., alphabetic, numeric or a combination thereof. The password in one embodiment, for example, is a single word, but in other embodiments, the password is a paragraph including spaces, numbers and letters. Additionally, in one embodiment, the password is a small collection of numerals, which is also referred to herein as a personal identification number (PIN). In yet other embodiments, the password is a physical characteristic of the user, e.g., a voice of the user, a thumbprint of the user, and/or retinal characteristics of the user.

According to several embodiments of the present invention, one or more representations of a password are used during the initialization process, and in some embodiments, one or more representations of the password are used during an authentication process.

As used herein, the term representation is used to make clear that various forms of the password may be utilized, including the unmodified password itself, and fall within the scope of the present invention. According to several embodiments, a representation of the password is information derived from the password. In some embodiments for example, a representation of the password includes the password along with other information. In other embodiments, a representation of the password includes a digital signature of the password. The digital signature may be created with a variety of the digital signature algorithms including, but not limited to MD4, MD5 and SHA. In yet other embodiments, a representation of the password is a digital signature of a combination of a password and additional information. In yet further embodiments, a representation of the password is a digitized representation of a spoken password. Thus, a representation of a password according to several embodiments of the present invention is either a modified or unmodified form of the password.

Next, a dialog between the mobile communication device 200 and the trusted server 108 is opened (Step 302). As discussed further herein, in some embodiments, during initialization the user is in direct communication with the trusted server 108, e.g., behind a firewall; thus, preventing interception of the user information by a third party "man in the middle." In other embodiments, the user is in communication with the trusted server 108 via a collection of networks, e.g., the network 100.

In several embodiments, shared information about the user is stored in the user programmable memory 204 of the mobile communication device 200 (Step 304). In some embodiments, as discussed with reference to FIG. 7, the shared information is a representation of a password, e.g., a digital signature of a password. In other embodiments, as will be discussed with reference to FIG. 10, the shared information is a "shared secret." As discussed further herein with reference to FIG. 6, the trusted server 108 utilizes, at least indirectly, the shared information during an authentication/authorization process according to several embodiments.

At the trusted server 108, a representation of the shared information is stored (Step 306). In some embodiments, the representation of the shared information is the same as the shared information stored at the mobile communication device 200 at Step 304. In another embodiment, as described further with reference to FIG. 10, the shared information is a "shared secret" and the representation of the "shared secret" stored at the trusted server 108 is an encrypted version of the "shared secret."

In other embodiments, however, the shared information stored at the trusted server 108 is a representation of a password. In one embodiment for example, the shared information stored at the mobile communication device 200 is a representation of a password, e.g., a digital signature of the password, and the shared information stored at the trusted server 108 is another representation of the password, e.g., a digital signature of a concatenation of the password and a username.

A username is in several embodiments is associated at the trusted server 108 with the shared information and an address of the mobile communication device 200. As discussed further herein, in some embodiments, the user interacts with several trusted servers 108 and each trusted server 108 has a different username associated with the user. For example, a user may desire to access a resource in a first corporation, which has its own trusted server, and the same user later accesses a resource at a second corporation, which has its own trusted server. The same user may also access an inside of a building, which has a trusted server supported by a third party service provider, e.g., a cellular network provider.

In other embodiments, a user has several accounts at the trusted server 108 and a different username is associated with each account. It should be recognized that the username in some embodiments is generated by (or already present on) the trusted server 108, and in other embodiments the user provides the username to the trusted server 108.

According to several embodiments, a user is able to establish security accounts in the security portion 216 of the mobile communication device 200, each of which corresponds to a respective trusted server 108. In these several embodiments, each security account includes a username and shared information that is associated with a corresponding trusted server 108, which maintains an account for the user containing a representation of the shared information.

In some embodiments, the user is able to establish a set of request codes during initialization that are used in connection with a particular transaction management system 106. The purpose of the request codes is to avoid the transmission of substantial amounts of data from the transaction management system 106 to the trusted server 108, and then subsequently to the mobile communication device 104. By storing relevant information on the mobile communication device 104 and associating it to a request code, the only information that needs to be passed around is the request code itself.

Additionally, it may be advantageous to provide the transaction management system 108 with ancillary information about the user, e.g., their phone number and physical address. Assuming this information has been collected by the trusted server 108, it can be passed to the transaction management system 106 if the request code indicates it is needed. An advantage of this approach is that the user doesn't need to re-input common information over and over again. The user simply inputs the information once, at the trusted server 108, which then distributes it to others when authorized by the user's approval of a transaction.

Figure 4:
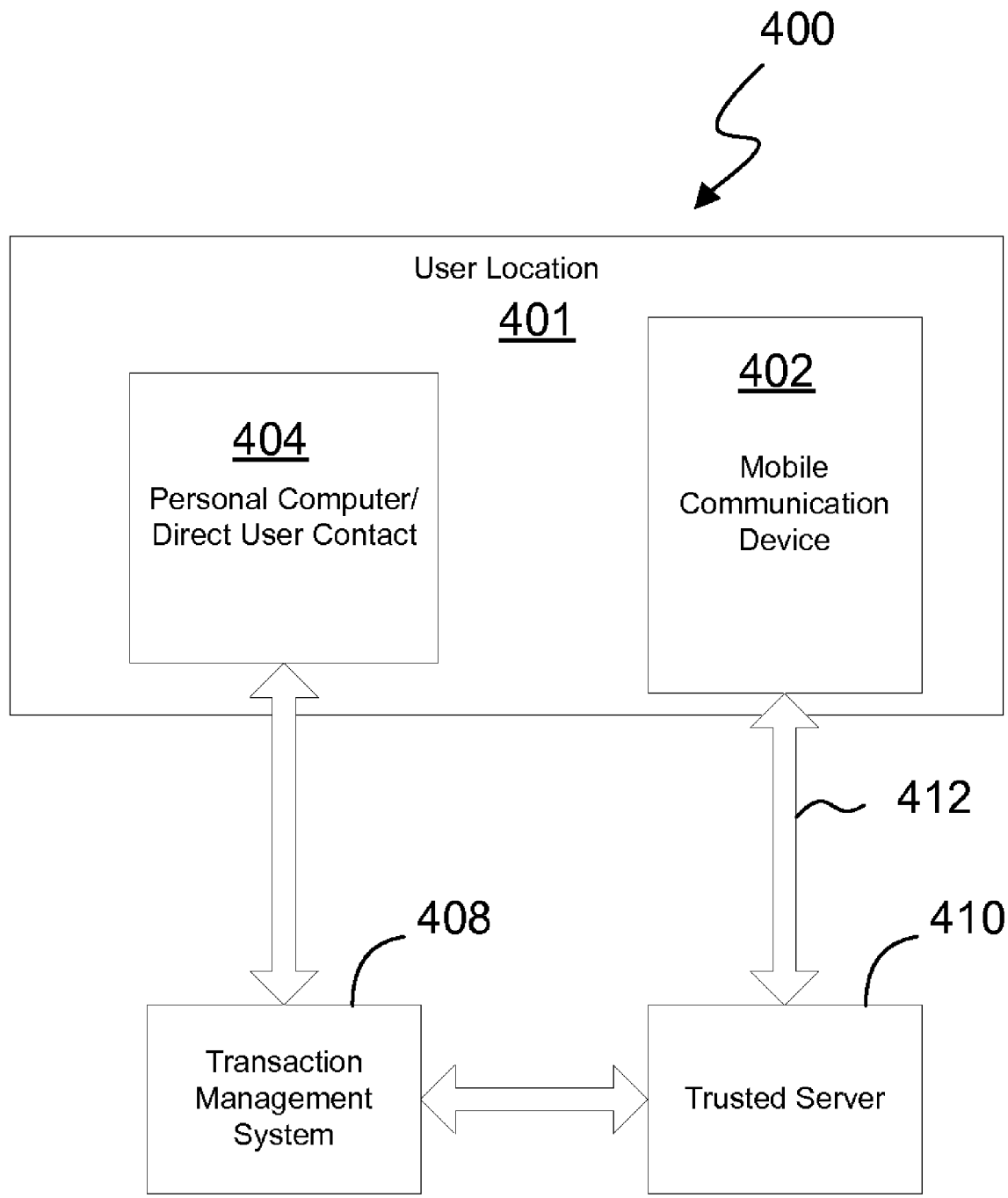
FIG. 4 is a block diagram illustrating an operating environment in which the authentication/authorization system according to some embodiments may be implemented.

Referring next to FIG. 4, shown is a block diagram illustrating an operating environment 400 in which the authentication/authorization system according to some embodiments is implemented. As shown in FIG. 4, a user is assumed to be in possession of a mobile communication device 402 and located proximate a user interface 404 at a user location 401. In the embodiment of FIG. 4, the user interacts with a transaction management system 408 via the user interface 404. The user interface 404 may be furnished to the user by a variety of devices including, for example, a personal computer (e.g., the personal computer 102), a personal digital assistant or a keypad assembly (e.g., located upon the outside of a building the user desires to enter). In some embodiments, as shown in FIG. 4, user interface 404 is separate from the mobile communication device 402, but the user interface 404 and the mobile communication device 402 are present at the same location 401.

As shown in FIG. 4, in some embodiments, the mobile communication device 402 is in communication with the trusted server 410, and the transaction management system 408 is in communication with the user interface 404 and the trusted server 410.

Figure 5:
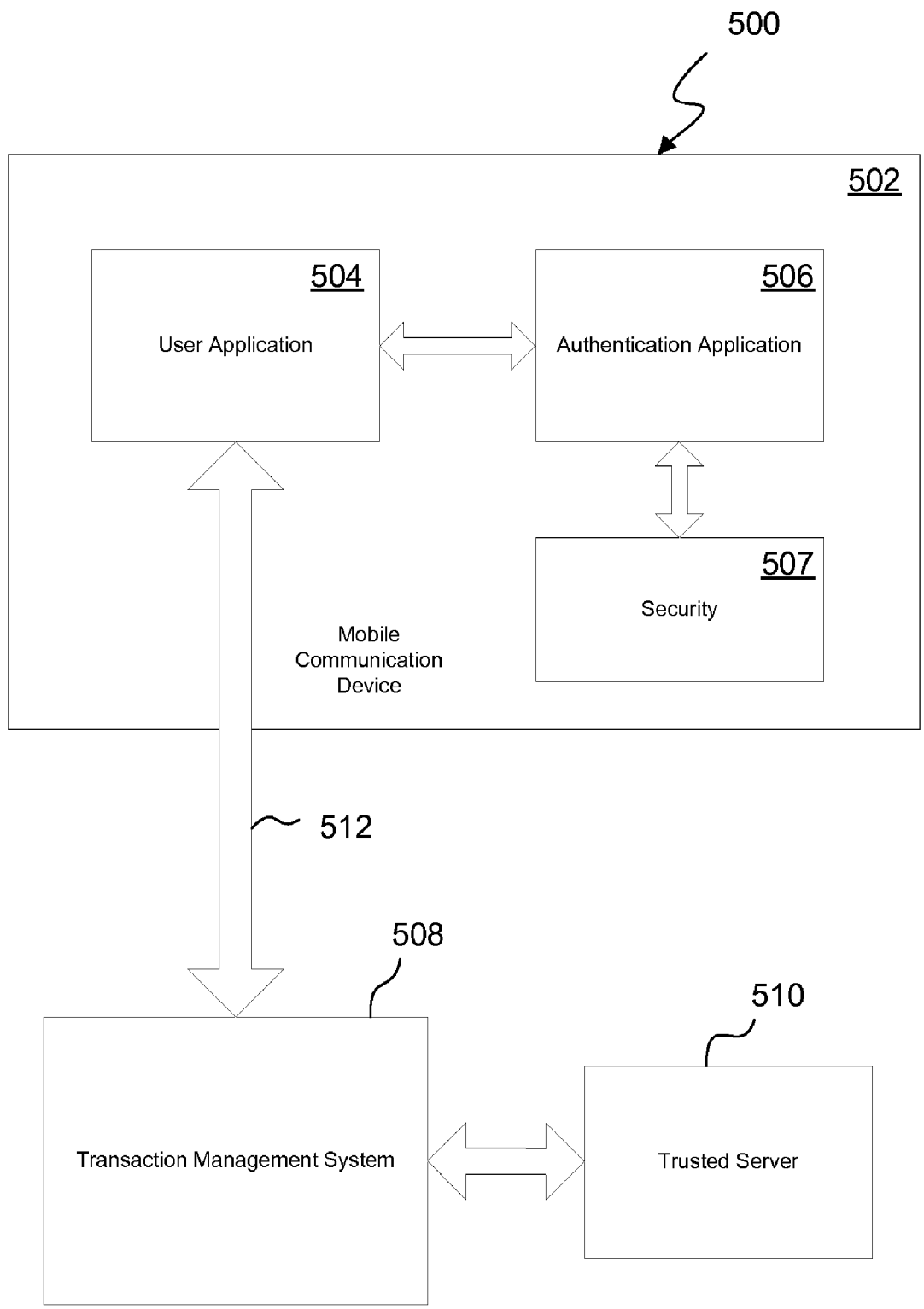
FIG. 5 is a is a block diagram depicting a physical environment in which the authentication/authorization system according to some embodiments may be implemented.

In other embodiments, a mobile communication device, e.g., the mobile communication device 200, provides an interface between the user and a transaction management system. Referring to FIG. 5, for example, shown is a block diagram depicting a physical environment 500, in which a mobile communication device 502 includes a user application 504 that is in communication with an authentication application 506, and the transaction management system 508. The environment represented in FIG. 5 is logically similar to that of FIG. 4 except that the user application 504 is running on the mobile communication device 502 instead of on a personal computer, e.g., the personal computer 102.

In several embodiments, the user application 504 is a user software application, which may be a web browser, a daytimer application, personal information management (PIM) software, sales force automation software, meeting scheduling software, book purchasing software, prepaid cell phone minute purchasing software, a doctors prescription writing tool and Enterprise Resource Planning (ERP) software.

Figure 10:
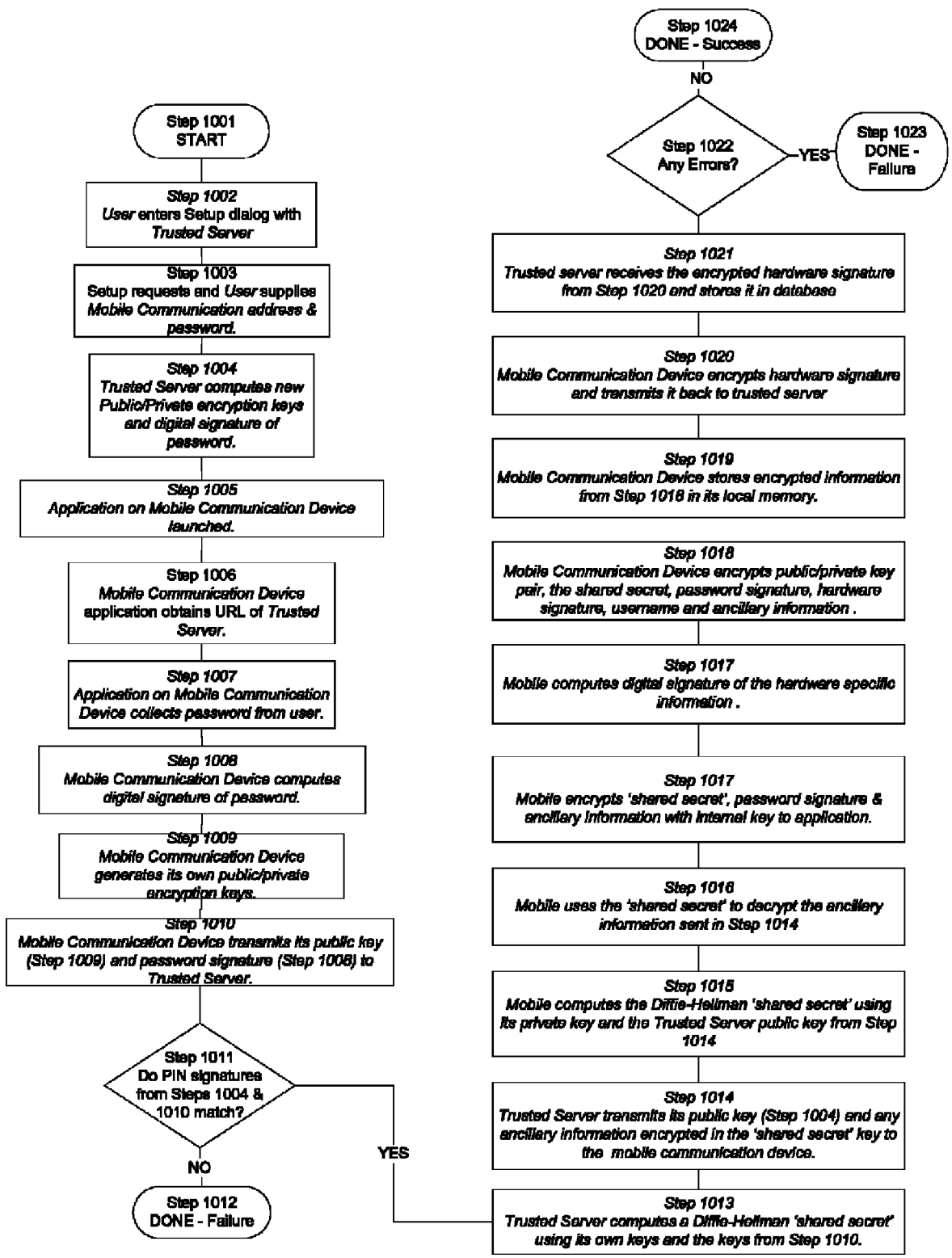
FIG. 10 is a flow chart illustrating steps carried out by the mobile communication device of FIGS. 1, 2 and 5 and the trusted server of FIGS. 1 and 5 during an initialization phase according to another embodiment of the present invention.

In some embodiments, the user application 504 carries out many of the authentication/authorization steps described further herein with reference to FIG. 10. In addition, the user application may be configured to access an API of the authentication application 506 for a temporary key, which the authentication application 504 may produce from various types of information. Such information may include, e.g., shared information stored in the security portion 507 of a user programmable memory (e.g., the user programmable memory 204), as described further herein with reference to FIG. 12. In these embodiments, the authentication application 506 is also referred to as an extension application.

Figure 6:
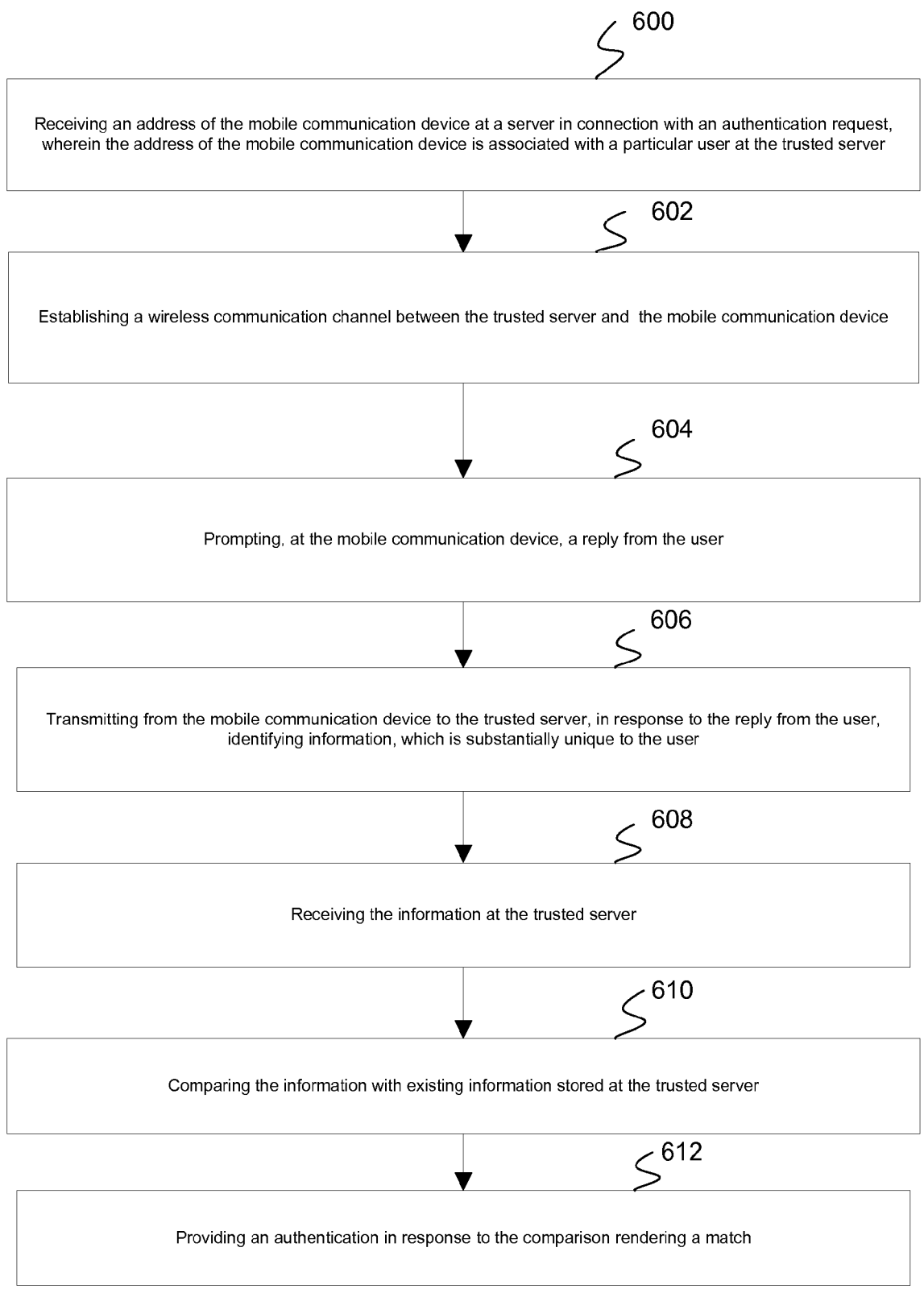
FIG. 6 is a is a flow chart showing steps traversed during authentication/authorization according to several embodiments of the present invention.

While referring to FIGS. 4 and 5, simultaneous reference will be made to FIG. 6, which is a flow chart showing steps traversed during authentication/authorization according to several embodiments of the present invention.

Initially, when the transaction management system desires authenticate the user, and/or have the user authorize a transaction, the trusted server 410, 510 receives information from the transaction management system 408, 508 that allows the trusted server 410, 510 to locate an account for the user at the trusted server 410, 510 (Step 600). In some embodiments the information received at the trusted server 410, 510 includes an address of the mobile communication device 402, 502. In one embodiment for example, only the address of the mobile communication device 402, 502 is initially received from the transaction management system 408, 508.

Next, a communication path including a wireless link 412, 512 is established between the trusted server 410, 510 and the mobile communication device 402, 502 (Step 602). In some embodiments, as shown with reference to FIG. 4, the communication path does not include the transaction management system 408. In other embodiments, as shown with reference to FIG. 5, the communication path includes the transaction management system 508.

In some embodiments, the trusted server 410, 510 initiates the communication with the mobile communication device 402, 502, and in other embodiments, the communication between the trusted server 410, 510 and the mobile communication device 402, 502 is initiated from the mobile communication device 402, 502.

Once the trusted server 410, 510 has established communication with the mobile communication device 402, 502, the user is prompted for a reply at the mobile communication device 402, 502 (Step 604). In several embodiments, the trusted server 410, 510 communicates information to the mobile communication device 402, 502 that conveys to the user why the user is being requested to reply. In some embodiments, the reply takes the form of a password entered at the mobile communication device 402, 502 (e.g., via a keypad, touch screen or microphone). In other embodiments, the reply consists of a yes or no answer to a specific question entered at the mobile communication device 402, 502 (e.g., via a keypad, touch screen or microphone).

In response to receipt of the reply from the user, the mobile communication device 402, 502 transmits identifying information, which is substantially unique to the user, to the trusted server 410, 510 (Step 606). The identifying information may comprise information, which allows the trusted server 410, 510 to verify the user is in possession of their assigned mobile communication device 402, 502. In several embodiments, the identifying information sent to the trusted server 410, 510 is produced, at least in part, from information stored by the user during initialization in a user programmable memory (e.g., the user programmable memory 204). As a consequence, the identifying information in these several embodiments is a function of user-determined information (e.g., a password entered by the user).

In some embodiments, the identifying information is produced in part from shared information that was provided to both the mobile communication device 402, 502 and the trusted server during initialization 410, 510. In many embodiments, the shared information (e.g., a digital signature of a password or a shared secret key) is stored in a user programmable memory, e.g., the user programmable memory 204. In one embodiment, the identifying information is a digital signature of shared information (e.g., a representation of a password or a shared secret) concatenated with other information that is associated with the user, e.g., a username.

Advantageously, the identifying information, in some embodiments, is not stored at either the mobile communication device 402, 502 or the trusted server 410, 510; thus making it difficult for an unauthorized user to recreate the identifying information and fool the trusted server 410, 510.

Once the identifying information is received at the trusted server 410, 510 (Step 610), the trusted server determines whether the identifying information is associated with information stored at the trusted server for the user. For example, the trusted server determines whether the identifying information is associated with the address of the mobile communication device.

In some embodiments, the trusted server determines whether the identifying information is associated with the information at the trusted server about the user by comparing the identifying information with verification information at the trusted server 410, 510. The verification information according to several embodiments is computed from information produced from the trusted server 410, 510.

In some embodiments, the verification information is produced in part from shared information that was provided to both the mobile communication device 402, 502 and the trusted server during initialization 410, 510. In many embodiments, the shared information (e.g., a representation of a password or a shared secret key) is stored at a database of the trusted server. In one embodiment, the verification information is a digital signature of shared information (e.g., a representation of a password or a shared secret) concatenated with other information that is associated with the user, e.g., a username. The verification information may be stored at the trusted site 410, 510 during, for example, initialization of a user account at the server. As is discussed further with reference to FIG. 12, the verification information may be produced, e.g., calculated, at the trusted site 410, 510, at least partially on the basis of the shared information.

If the verification information matches the identifying information, the trusted server 410, 510 then provides an authentication message to the transaction management system 408, 508 (Step 612). In some embodiments, the authentication is a communication serving to inform the transaction management system 408, 508 that the user is authorized to access a server or content within a site controlled by the transaction management system 408, 508. In other embodiments, the authentication is a communication to the transaction management system 408, 508 that the user has authorized a transaction to take place, e.g., a transfer of money or a purchase.

Figure 7:
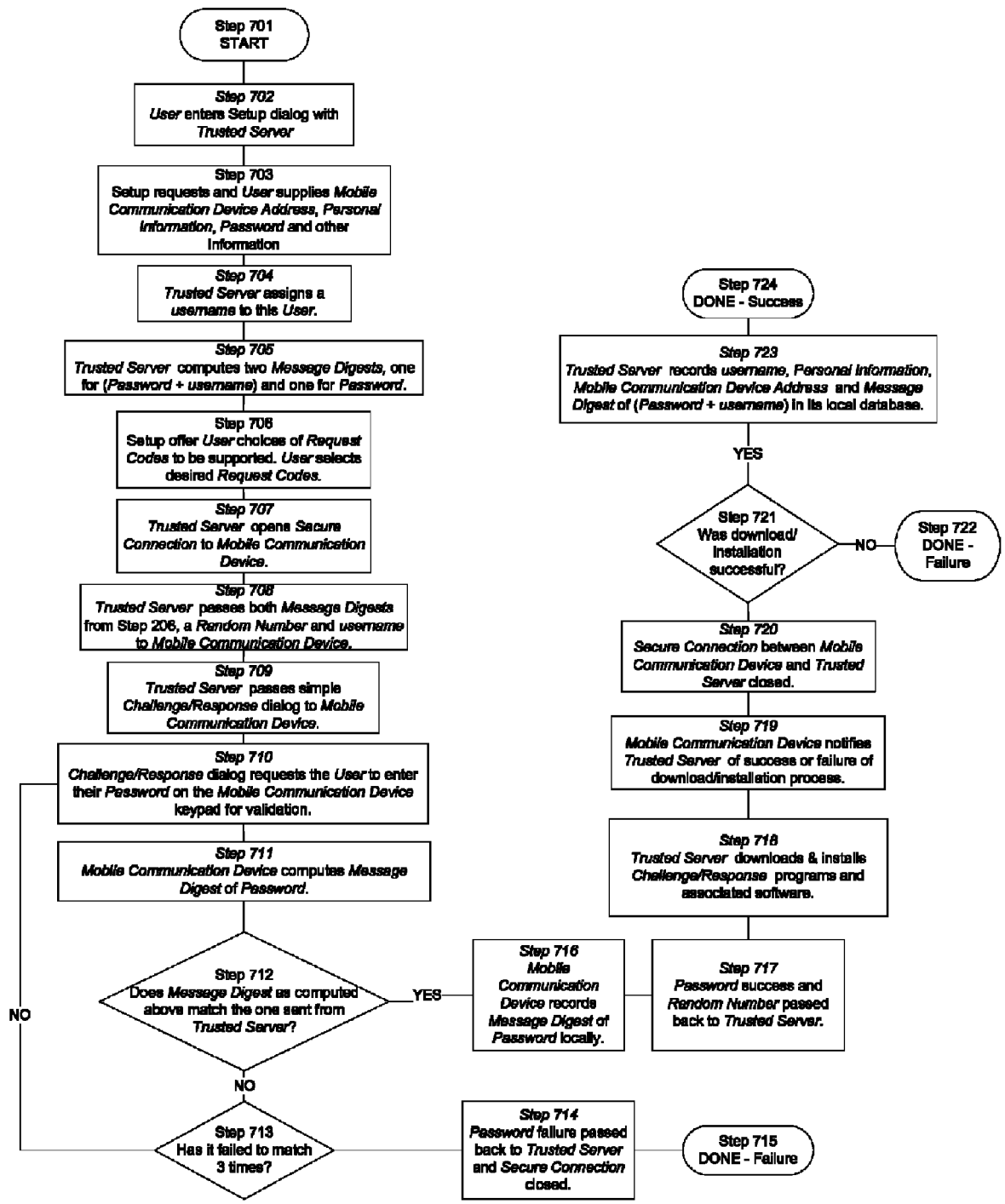
FIG. 7 is a flow chart depicting steps carried out during initialization of a mobile communication device of FIGS. 1, 2 and 4 with a trusted server of FIGS. 1 and 4 according to one embodiment of the present invention.

Referring next to FIG. 7, there is shown is a flow chart depicting steps carried out during initialization of a mobile communication device (e.g., the mobile communication device 104, 200, 402) with a trusted server, e.g., the trusted server 108, 410 according to one embodiment of the present invention.

In the present embodiment, the user first sets up communication with the trusted server 108, 410 (Step 701). In one embodiment for example, the user sets up the communication with the trusted server via the personal computer 102, but this is certainly not required.

After communication is set up between the trusted server 108, 410 and the user, the user then requests that a new account be created for the user, and also requests that their mobile communication device 104, 200, 402 be initialized (Step 702).

In response, the trusted server 108, 410 responds by asking the user to supply information (Step 703). In one embodiment, the information requested includes the user's name, address and other information. In another embodiment, the trusted server 108, 410 requests the address for the mobile communication device 104, 200, 402 and a password in addition to the user's name, address and other information.

Next, the trusted server 108, 410 then assigns a username to the user and stores the username in a database of the trusted server 108, 410 (Step 704). In this embodiment, the trusted server 108, 410 uses the username as a unique identifier of the user in the database system of the trusted server 108, 410. It should be recognized, however, that the username is not required to be unique beyond the database system of the trusted server 108, 410.

In the present embodiment, the trusted server 108, 410 then computes a digital signature of both the password and the combination of both the password and username (Step 705).

In addition, the trusted server 108, 410 in the present embodiment then asks the user which request codes the user would like to support, and the user makes a selection, which is also stored in the database of the trusted server 108, 410 (Step 706). In one embodiment, the user is able to select request codes from among a listing of several requests codes, which are each associated with a specific action.

After user information is established and stored at the trusted server 108, 410 in the present embodiment, the trusted server 108, 410 opens a secure connection with the mobile communication device 104, 200, 402 (Step 707). In the present embodiment this connection is an HTTPS session; but this is certainly not required. As discussed further herein, e.g., with reference to FIG. 10, other methods of securing the connection can be used.

After a secure connection is established between the mobile communication device 104, 200, 402 and the trusted server 108, 410, the trusted server 108, 410 sends both digital signatures computed in Step 705 (i.e., the digital signature of the password and the digital signature of the combination of the password and username), and the username to the mobile communication device 104, 200, 402 over the secure connection. All three of these items are stored on the mobile communication device 104, 200, 402 for the use of the remainder of the steps described with reference to FIG. 7.

Next, the trusted server sends a confirmation dialog to the mobile communication device 104, 200, 402 (Step 709). The purpose of this dialog is to insure that the mobile communication device 104, 200, 402 being initialized is the correct one. In the present embodiment this dialog is an HTML page that is displayed on the mobile communication device 104, 200, 402. With this step, appropriate code is loaded into the mobile communication device 104, 200, 402 to allow for digital signature computation and logic associated to the validation process described in the following steps.

Next, the dialog downloaded as described with reference to Step 709 requests that the user enter their password on the keypad of the mobile communication device 104, 200, 402 (Step 710). Once the user has entered the password, the processor of the mobile communication device 104, 200, 402 computes the digital signature of the password entered in Step 709 (Step 711).

The digital signature computed in Step 711 is then compared with the digital signature of the password that was uploaded to the mobile communication device as described with reference to Step 708 (Step 712).

If the two digital signatures compared in Step 712 do not match, the mobile communication device 104, 200, 402 again asks the user to input their password (Step 713). This process is repeated a number of times until either the user successfully enters the password or a limiting counter is exceeded.

If the limiting counter is exceeded, the mobile communication device 104, 200, 402 and the trusted server 108, 410 terminate the current session (Step 714). After the session has ended, error handling and termination logic is begun (Step 715).

If the user successfully enters the password pursuant to Step 710, the mobile communication device 104, 200, 402 records the digital signature of the password in its permanent memory (i.e., in its user programmable memory) (Step 716).

Acknowledgement of successful password entry is then sent back to the trusted server 108, 410 from the mobile communication device 104, 200, 402 (Step 717). Upon receipt of notification of successful password entry, the trusted server 108, 410 downloads and installs additional challenge/response dialogs as required to support the selected request codes onto the mobile communication device 104, 200, 402 (Step 718). The trusted server 108, 410 also downloads and installs programs and logic needed to support the steps described with reference to FIGS. 8 and 9.

The mobile communication device 104, 200, 402 then notifies the trusted server 108, 410 of success or failure of the download process (Step 719), and the secure connection generated in Step 707 is closed (Step 720). If the download process failed (Step 721), error handling is undertaken (722).

If the download process was successful (Step 721), the trusted server 108, 410 records the username, personal information, the address of the mobile communication device 104, 200, 402 and the two digital signatures computed in Step 705 (i.e., a digital signature of the password and the digital signature of the combination of the password and username) in its database.

Figure 8:
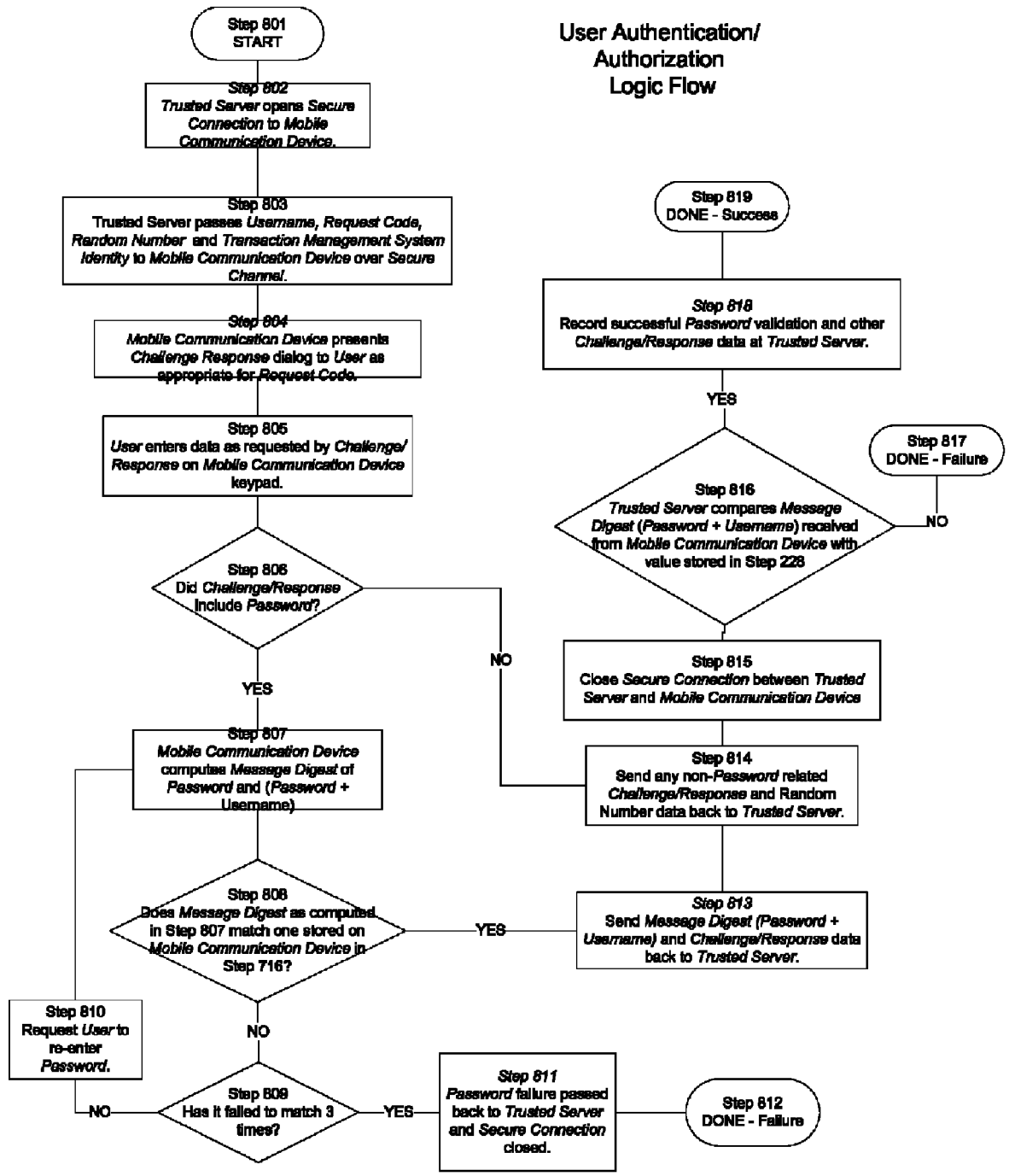
FIG. 8 is a flowchart depicting steps carried out during authentication of a user by the trusted server of FIGS. 1 and 4 and the mobile communication device of FIGS. 1, 2 and 4 according to one embodiment of the present invention.
Figure 9:
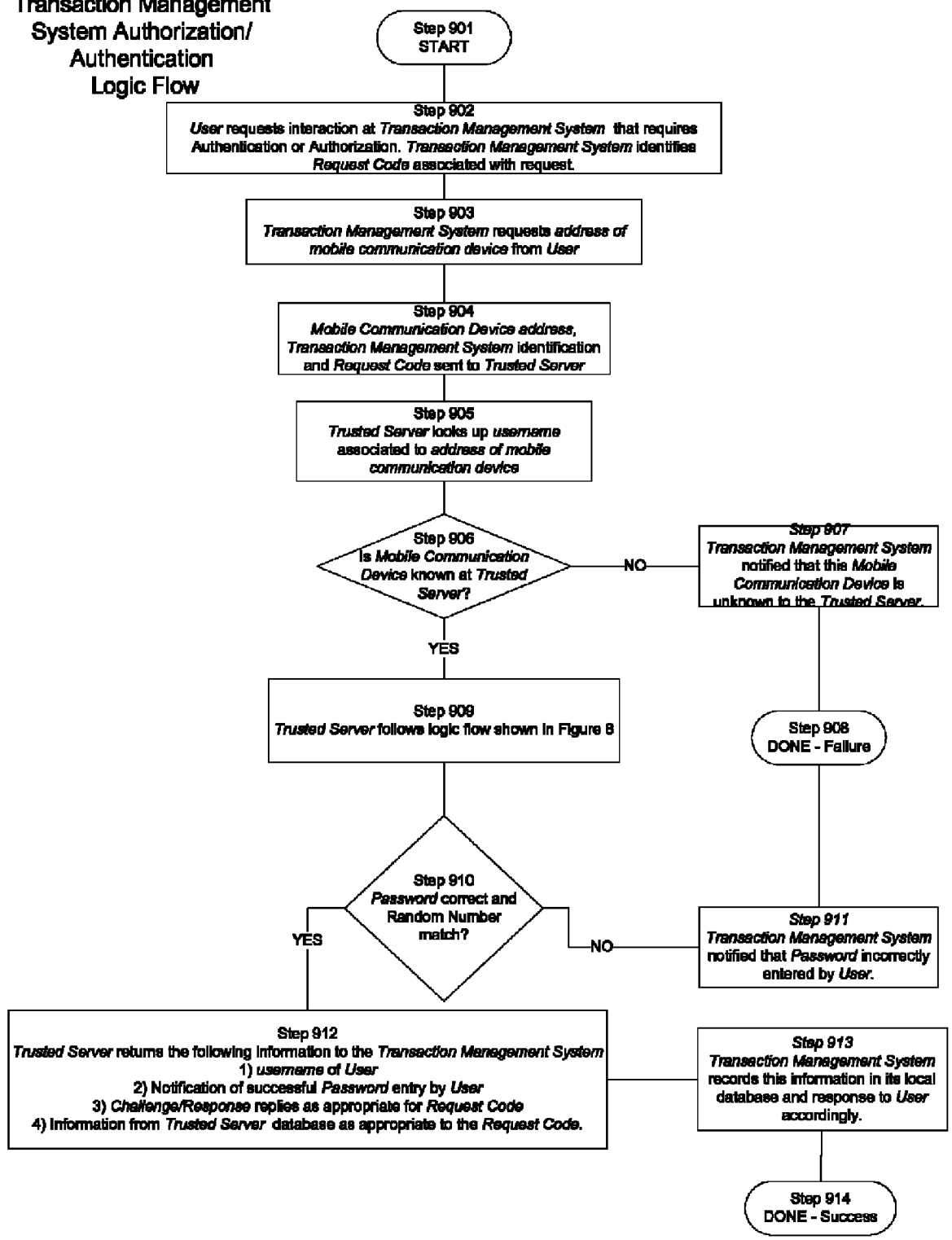
FIG. 9 is a is a flow chart depicting steps traversed during an authentication/authorization of a user by trusted server of FIGS. 1 and 4 and the transaction management system of FIGS. 1 and 4 in accordance with one embodiment of the present invention.

The information is now loaded onto the mobile communication device 104, 200, 402 and in a database of the trusted server 108, 410 utilized in supporting the logic of FIGS. 8 & 9 (Step 724). Thus, Steps 701 through 724 represent one embodiment of accomplishing Steps 300 through 306 of FIG. 3.

Referring next to FIG. 8, shown are steps carried out during authentication according to one embodiment of the present invention. According to the present embodiment, the trusted server 108, 410 validates that the user is both in possession of the mobile communication device 104, 200, 402 and knows the proper challenge/response dialog.

In the present embodiment, as described further with reference to FIG. 9, the authentication process is initiated (Step 801) when a user has initiated some action. For example, the user may have requested access to a resource controlled by the transaction management system 106, 408. In this case the transaction management system 106, 408 requires confirmation that the user is authorized to access the resource.

Once the authentication process is initiated (Step 801), the trusted server 108, 410 opens up a connection with the mobile communication device 104, 200, 402 (Step 802). In one embodiment, the connection is a secure channel connection. Any of the standard mechanisms for establishing a secure channel for the exchange of digital electronic information may be used, such as SSL and HTTPS.

The trusted server 108, 410 then passes the user's username, a request code and the identity of the transaction management system 106, 408 to the mobile communication device 104, 200, 402 over the connection (Step 803). At this point, the mobile communication device 104, 200, 402 activates a challenge/response dialog as appropriate to the request code sent in (Step 804).

The user then enters data as requested by the challenge/response dialog using, e.g., the keypad of the mobile communication device 104, 200, 402 (Step 805). If the challenge/response dialog associated with the request code requires the user to enter a password (Step 806), the user enters a password, and the processor of the mobile communication device 104, 200, 402 computes a digital signature of both the entered password and of the combination of the entered password and the username (Step 807).

Many logical combinations of these two pieces of information can be used; however, the logical combination must be the same as used in Step 705. In the present embodiment, the point is to create a digital signature that can be compared to the one generated pursuant to Step 705. However, it is beneficial when the signature is different from that of the password by itself. The goal is to eliminate the possibility of a spoofing of the system by replaying the digital signature of the password as stored on the mobile communication device 104, 200, 402. The digital signature of the password by itself will be compared on the mobile communication device 104, 200, 402 with the signature stored on the mobile communication device 104, 200, 402 in Step 723. In the present embodiment, this comparison is done locally to the mobile communication device 104, 200, 402 to insure a quick response to the user's password entry. In this way, mistakes are quickly caught, and the user is allowed to correct any entry mistakes without having to send packets over the wireless network. When the entry is validated locally, the digital signature of the combination is sent to the trusted server 108, 410 for final validation. Since the digital signature of the combined password and username is not stored on the mobile communication device 104, 200, 402 it is not possible to spoof the trusted server 108, 410 by replying with information stored on the mobile communication device 104, 200, 402 (e.g., by replying with the digital signature of the password alone).

After the mobile communication device 104, 200, 402 computes the digital signature of the password, the digital signature of the password as generated in Step 807 is compared with the one stored on the mobile communication device 104, 200, 402 in Step 723 (Step 808).

If the comparison performed in Step 808 fails more than a predetermined number of times (e.g., three times) (Step 809), then the trusted server 108, 410 is notified of the failure and the connection between the mobile communication device 104, 200, 402 is closed (Step 811). In some embodiments, the stored representation of the password (e.g., the digital signature of the password), is deleted from the mobile communication device 104, 200, 402. In one embodiment, error recovery is optionally initiated at the trusted server 108, 410 (Step 812).

If the comparison performed in Step 808 fails, but has not failed more than the predetermined number of times, then the mobile communication device 104, 200, 402 requests the user to try entering the password again (Step 810).

If the comparison performed in Step 808 renders a match, then the digital signature of the logical combination of the password and the username is sent to the trusted server 108, 410 (Step 813). In this case, all data entries requested by the challenge/response dialog and entered by the user are also sent to the trusted server 108, 410 (Step 814), and the connection between the trusted server 108, 410 and the mobile communication device 104, 200, 402 is closed.

Next, the trusted server 108, 410 receives the digital signature of the logical combination of the password and the username from Step 813 and compares this to the associated value stored at the trusted server 108, 410 in Step 223 (Step 816).

If the two digital signatures compared in Step 816 do not match, then an error recovery process begins (Step 817). This process in one embodiment will include informing the user, through the transaction management system 106, 408, that the password check at the mobile communication device 104, 200, 402 has failed.

If the two digital signatures compared in Step 816 do match, then successful entry of the password is recorded at the trusted server 108, 410. The transaction management system 106, 408 is also informed of this result and provided with other information collected in the challenge/response dialog as appropriate to the request code(s) (Step 818). At this point, the validation process has been completed successfully (Step 819).

Referring next to FIG. 9, shown is a flow chart depicting steps traversed during an authentication/authorization of a user in accordance with one embodiment of the present invention. In some embodiments, the authentication/authorization process is initiated when the user requests access to some resource controlled by the transaction management system 106, 408. In other embodiments, the authentication/authorization process is initiated when the transaction management system 106, 408 requests an authorization from the user, e.g., authorization from the user approving a transaction.

The transaction management system 106, 408 in turn requests that the trusted server 108, 410 engage in the logic flow described in FIG. 8 to validate the user's possession of the mobile communication device 104, 200, 402 and the user's knowledge of challenge/response answers. The trusted server 108, 410 then returns the results of this logic flow to the transaction management system 106, 408.

The authentication of a user is initiated (Step 901), for example, in response to the user initiating a request for access to a resource controlled by the transaction management system 106, 408. In other embodiments, steps to authenticate a user are initiated when the transaction management system 106, 408 is attempting to acquire an authorization from a user to carry out a transaction.

Once the authentication/authorization process is initiated, in the present embodiment, the transaction management system 106, 408 acknowledges the user's request and identifies an appropriate request code that is associated with the user's specific request (Step 902). In this embodiment, the trusted server 108, 410 and the transaction management system 106, 408 have agreed upon a selection of allowable actions and developed a system to classify these actions as request codes. A challenge/response dialog appropriate for each request code has also been created and stored at the trusted server 108, 410. Furthermore, in this embodiment a scheme for identifying various transaction management systems with an identifier is also established.

The transaction management system 106, 408 requests the user to enter the address of the mobile communication device 104, 200, 402 (Step 903). For example, when the mobile communication device 104, 200, 402 comprises a cell phone, the user enters their cell phone number.

After the user enters the address of the mobile communication device 104, 200, 402, the entered address, a transaction management system identification and a request code are passed over to the trusted server 108, 410 (Step 904). In one embodiment, the entered address, transaction management system identification and request code are passed over to the trusted server 108, 410 over a secure connection.

Next, the trusted server 108, 410 attempts to lookup the address of the mobile communication device 104, 200, 402 in its database (Step 905), and if the trusted server 108, 410 does not find the address (Step 906), the transaction management system 106, 408 is notified that the address of the mobile communication device 104, 200, 402 entered is not known to the trusted server 108, 410 (Step 907). In such an event, error processing proceeds at both the trusted server 108, 410 and the transaction management system 106, 408 (Step 908).

If the address of the mobile communication device 104, 200, 402 is found (Step 906), then in the present embodiment, the username associated with the mobile communication device 104, 200, 402 is retrieved. Next, the steps described with reference to FIG. 8, beginning at Step 801, are carried out to authenticate the user, and/or receive authorization from the user (Step 909). This results in the trusted server 108, 410 validating the user's entry of their password at the mobile communication device 104, 200, 402, and collecting ancillary challenge/response input.

If the user is not authenticated during the steps described with reference to FIG. 8 (Step 910), the transaction management system 106, 408 is notified that the user failed to enter the correct password. The transaction management system 106, 408 then takes action it deems appropriate (Step 911). For example, the transaction management system 106, 408 may inform the user of the failed attempt and refrain from carrying out any resource access requests submitted by the user.

If the user is authenticated during the steps described with reference to FIG. 8 (Step 910), the trusted server 108, 410 now informs the transaction management system 106, 408 of the success of the password entry and also of the ancillary information entered by the user in the challenge/response dialog (Step 912). Note that this may be a subset of the data entered by the user as controlled by the request code. That is, some request codes may cause all the data entered to be passed back to the transaction management system 106, 408, and other request codes may cause only a subset of the data to be passed back. In one embodiment, the username and all or a subset of the personal information known by the trusted server 108, 410 is passed back to the transaction management system 106, 408. Again, in the present embodiment, whether all or a subset of the personal information is passed back is controlled by a request code. It should be noted that this allows the transaction management system 106, 408 server to acquire the personal information collected at the trusted server 108, 410 during the steps described with reference to FIG. 7.

The transaction management system 106, 408 then records the information from Step 912 into its local database and responds to the user accordingly (Step 913). (e.g., the transaction management system 106, 408 informs the user authentication/authorization is complete), and the authentication/authorization is complete. (Step 914). Thus, Steps 901 through 914 represent one approach to accomplishing Steps 600 through 612 of FIG. 6 for purposes of authenticating a user. In cases in which the transaction management system 106, 408 is requesting an authorization from the user (e.g., an authorization to carry out a transaction) the transaction management system 106, 408 can be substantially certain that the authorization received via the mobile communication device 104, 200, 402 is from the user provided this authentication process has been successfully completed.

Beneficially, a user is able to enter and update their personal information in a single location (i.e., the trusted server 108, 410) and not have to re-enter this information for each transaction management system 106, 408. Note also that this method allows the user to change the address of their mobile communication device 104, 200, 402 at the trusted server 108, 410 without affecting the authentication/authorization steps described with reference to FIG. 9. Moreover, in several embodiments the user need not inform transaction management system 106, 408 of the change. That is, the user simply enters their new address for the mobile communication device 104, 200, 402, and the trusted server 108, 410 responds accordingly to update the address of the user's mobile communication device 104, 200, 402 in the database of the server. If the user (or someone else) enters the previous address of the mobile communication device 104, 200, 402, the trusted server 108, 410 will not authenticate the user for the transaction management system 106, 408.

As discussed above, FIG. 7 represents steps carried out during an initialization phase of the present invention according to one embodiment, and FIGS. 8 and 9 illustrate steps carried out during an authentication/authorization phase consistent with information stored at the trusted server 108, 410 and the mobile communication device 104, 200, 402. It should be recognized, however, that variations in the user information stored at the trusted server 108, 410 and/or the information exchanged between the trusted server 108, 410 and the mobile communication device 104, 200, 402 may vary without departing from the scope of the present invention. Referring next to FIG. 10, shown are an exemplary sequence of steps carried out by the mobile communication device 104, 200, 504 and the trusted server 108, 510 during an initialization phase according to another embodiment of the present invention.

Initially, a user sets up communication with the trusted server 108, 510 (Step 1001). In the present embodiment, this communication between the trusted server 108, 510 and the user is a secure one. In one embodiment for example, the user interacts with the trusted server 108, 510 from within the firewall of a trusted server 108, 510 (e.g., from behind a firewall at a corporation that supports the trusted server 108, 510). This is certainly not required, but having the mobile communication device 104, 200, 504 in communication with a trusted server 108, 510 behind a firewall provides enhanced security.

Once communication with the trusted server 108, 510 is established, the user enters a setup dialog with the trusted server 108, 510 (Step 1002). In one embodiment for example, the user requests that a new account be created for them and their mobile communication device 104, 200, 504 be initialized.

Next, the trusted server 108, 510 responds by asking the user to supply various elements of information (Step 1003). In this embodiment the requested information includes the address of the user's mobile communication device 104, 200, 504 and password. In another embodiment, other ancillary information such as a username is also required. Next, the trusted server 108, 510 computes and stores a public/private pair of encryption keys and a digital signature of the password (Step 1004). This information is stored in a database at the trusted server 108, 510.

The authentication application 214, 506 previously installed on the mobile communication device 104, 200, 504 is then launched (Step 1005). This authentication application 214, 506 can be launched either directly by the user from the mobile communication device 104, 200, 504 (e.g., by keypad of a cell phone) or it can be launched remotely from the trusted server 108, 510 by the sending of a wireless message designed for this purpose.

The mobile communication device 104, 200, 504 then obtains information to open a wireless dialog with the trusted server 108, 510 (Step 1006). In some embodiments, this information includes a URL of the trusted server 108, 510. In one embodiment, this information can be obtained at the mobile communication device 104, 200, 504 by direct input of the user on a keypad or touch screen of the mobile communication device 104, 200, 504. In another embodiment; the information is obtained through a wireless transmission from the trusted server 108, 510. In yet another embodiment, the information may be embedded in the authentication application 214, 506.

The authentication application 214, 506 next requires the user to enter their password in the mobile communication device 104, 200, 504 (e.g., via a keypad, touch screen or microphone) (Step 1007). The mobile communication device 104, 200, 504 then computes a digital signature of the password entered in Step 1007 (Step 1008).

In the present embodiment, the mobile communication device 104, 200, 504 then generates a public/private encryption key pair (Step 1009), and the mobile communication device 104, 200, 504 transmits its public key from Step 1009 and the signature of the password from Step 1008 to the trusted server 108, 510 (Step 1010).

A representation of the password (e.g., a digital signature of the password) as entered at the trusted server 108, 510 (Step 1003), and a representation of the password entered at the mobile communication device 104, 200, 504 (Step 1008) and transmitted to the trusted server 108, 510 (Step 1010), are compared at the trusted server 108, 510 (Step 1011). If they do not match, the initialization process halts with a security failure (Step 1012).

If the representation of the password (e.g., a digital signature of the password), as entered at the trusted server 108, 510 (Step 1003), and a corresponding representation of the password (e.g., digital signature of the password) entered at the mobile communication device 104, 200, 504 do match, the trusted server in the present embodiment now computes a "shared secret" encryption key using the Diffie-Hellman key exchange algorithm (Step 1013). In other embodiments, other key exchange algorithms are utilized.

In one embodiment, security is further enhanced by also incorporating an extension of Diffie-Hellman known as Fortified Key Negotiation, as described further in Applied Cryptography, second edition, by Bruce Schneier (see, e.g., Chapter 22), which is incorporated herein by reference.

Next the trusted server 108, 510 encrypts the username and other ancillary information obtained in Step 1003 in the "shared secret" key from Step 1013. The trusted server 108, 510 then transmits this encrypted information along with its public key (obtained in Step 1004) to the mobile communication device 104, 200, 504 (Step 1014).

The mobile communication device 104, 200, 504 then computes the same "shared secret" key using the same algorithms discussed in Step 1013 (Step 1015), and the mobile communication device 104, 200, 504 then decrypts the encrypted content sent by the trusted server 108, 510 in Step 1014 using the "shared secret" key obtained in Step 1015 (Step 1016).

The mobile communication device 104, 200, 504 then computes the digital signature of hardware-specific information available from the operating system of the mobile communication device 104, 200, 504 (Step 1017). In one embodiment, the hardware-specific information includes an amount of memory in the mobile communication device 104, 200, 504 and a model number of the mobile communication device 104, 200, 504. As discussed further herein with reference to FIG. 12, the hardware-specific information further reduces the likelihood of an authorized user fooling the authorization/authentication system.

Figure 11:
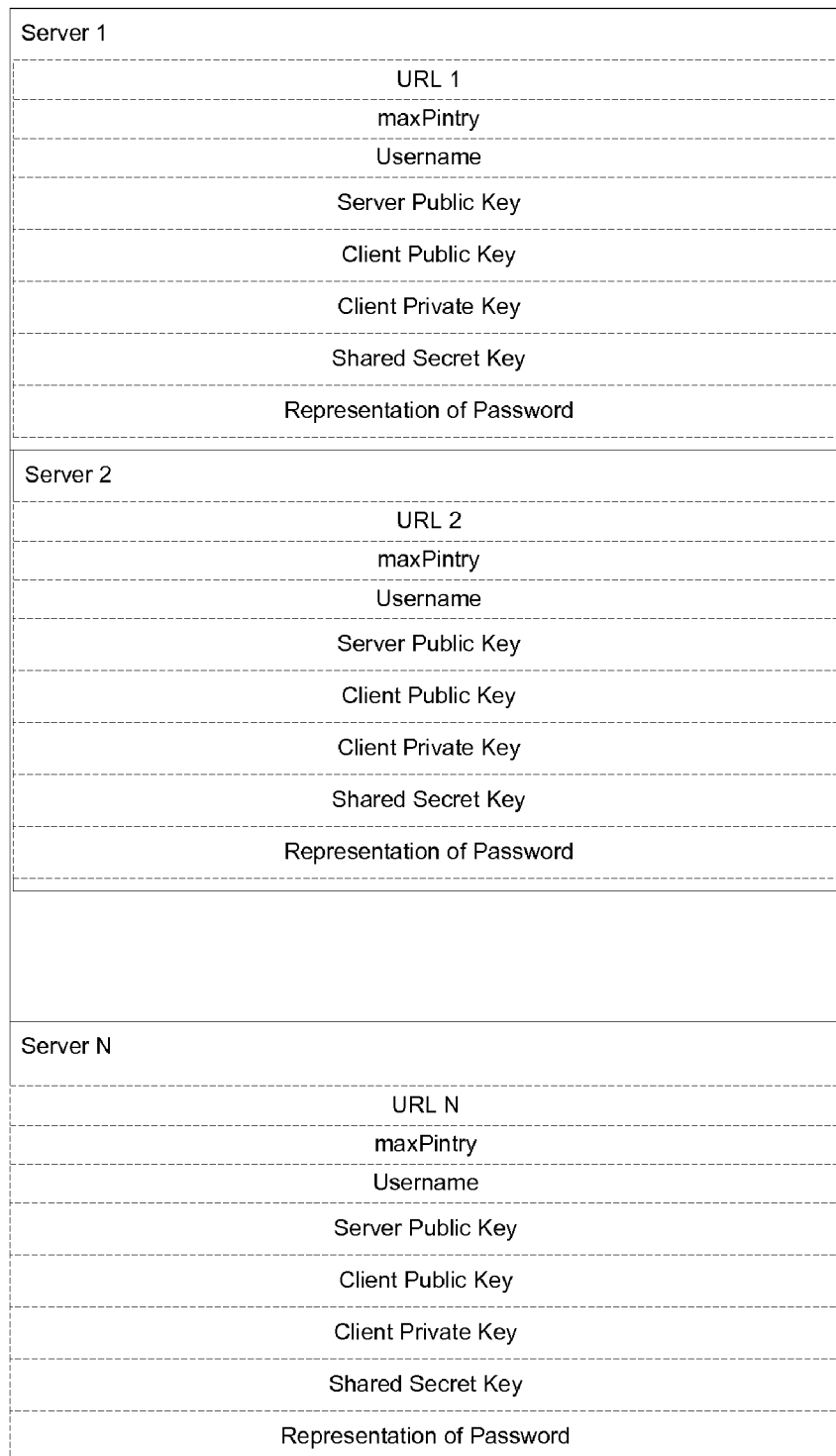
FIG. 11 is a diagram of the security portion of FIGS. 2 and 5 after the mobile communication device of FIGS. 2 and 5 is initialized by the process of FIG. 10.

The mobile communication device 104, 200, 504 then encrypts its public/private key pair, the "shared secret," a representation of the password (e.g., a digital signature of the password) and the hardware signature, username and any ancillary information (e.g., a counter for a number of password attempts during an authentication procedure as discussed further with reference to FIG. 11) (Step 1018). In this embodiment, a key used for this encryption is embedded within an application (e.g., the user application, the authentication application or other application) stored on the mobile communication device 104, 200, 504. In some embodiments, the key is embedded specifically for this purpose.

The mobile communication device 104, 200, 504 then stores the "shared secret," the representation of the password (e.g., a digital signature of the password, the hardware signature, username and any ancillary information from Step 1018 into its local memory for use during a subsequent authentication phase (Step 1019).

Next, the mobile communication device 104, 200, 504 encrypts the hardware signature and transmits it back to the trusted server 108, 510 (Step 1020). The trusted server 108, 510 receives the encrypted hardware signature from Step 1020, decrypts it and stores it in the database associated with the mobile communication device 104, 200, 504.

If any errors arose during the previous steps that prevented storage of the information described with reference to Step 1018 (Step 1022), then the user is notified that the initialization process has failed, and the initialization process is halted.

If no errors arise preventing storage of the information described with reference to Step 1018, then the user is notified that the initialization process was a success, and the initialization process is complete (Step 1024). The information is now loaded onto the onto the mobile communication device 104, 200, 504 and in the trusted server 108, 510 database required to support the authentication logic of FIG. 12. Thus, Steps 1001 through 1004 represent one embodiment of accomplishing Steps 300 through 306 of FIG. 3.

Advantageously, because information is stored in the user-programmable memory of the mobile communication device 104, 200, 504, the user may establish an account for each transaction management system 108, 508 the user interacts with. In several embodiments, for example, each separate account created in the user programmable memory has information unique to each corresponding transaction management system 108, 508 with which the account is associated.

Referring, next to FIG. 11, shown is a security portion (e.g., the security portion described with reference to FIG. 2) of a user-programmable memory of the mobile communication device 104, 200, 504 after being initialized by the process of FIG. 10. As shown in FIG. 11, the security portion includes N separate accounts and each account is associated with a specific transaction management system 108, 508.

In one embodiment, each account includes a URL for an associated transaction management system 108, 508, a username, a trusted site public key, a public key for the mobile communication device 104, 200, 504, a private key for the mobile communication device 104, 200, 504, a shared secret key and a representation of a password (e.g., a digital signature of a password).

Beneficially, because the security portion according to several embodiments of the present invention is within user programmable memory a user is able to add new accounts, and delete or modify an existing account.

Also shown is a Password Attempt, which is incremented by one each time a user enters an incorrect password during an authentication/authorization phase. In some embodiments, when Password Attempt exceeds an established maximum the representation of the password along with all the other information associated with the trusted server 108, 510 (i.e, the information stored at Step 1018) is deleted from the account. In some embodiments, the maximum number of tries is determined by a setting within an authentication application (e.g., the authentication application of FIG. 4).

It should be recognized that the particular fields in each account varies with the information stored during an initialization phase. For example, a security portion after the initialization process described with reference to FIG. 7 may include a representation of the password for each account and does not include any public or private keys or any shared key.

Referring next to FIG. 12, shown are steps carried out during an authentication/authorization phase when an application requesting authentication by the trusted server 108, 510 is running on the same mobile communication device 104, 200, 504 holding the initialization information as discussed in FIG. 10.

First, the user is utilizing the user application on the cell phone to communicate with a transaction management system (Step 1201). In several embodiments, the end points of a dialog described further herein are the trusted server 108, 510 and the cell phone; however it should be noted that in some embodiments the information exchanged passes through intermediary systems. For example, authentication information generated at the mobile communication device 104, 200, 504 may be submitted to a web page security system, and the web page security system then submits the authentication information to the Trusted server 108, 510 for validation.

Next, it is determined that an event exists that requires authentication at the trusted server 108, 510 (Step 1202). In some embodiments, the event is an action initiated by the user. In one embodiment, for example, the event is a user request to access content controlled by a transaction management system 108, 508. In other embodiments, the event is a transaction, which the user must authorize before it is carried out. In one embodiment for example, the user must authorize an electronic transaction (e.g., a transfer of bank funds or a purchase).

Next, the mobile communication device 104, 200, 504 then retrieves information from the user programmable memory (e.g., from the security portion, stored as described with reference to Step 1018) (Step 1203). In some embodiments, the retrieval of this information includes reading and decrypting the information previously stored in Step 1018. This results in retrieval of the username, representation of a password, and other information stored in Step 1018. (Step 1203).

The mobile communication device 104, 200, 504 then requests that the user enter their password in to the mobile communication device 104, 200, 504, and the mobile communication device 104, 200, 504 computes a representation of the password (Step 1204).

The representation of the password computed in Step 1204 is compared to the one retrieved in Step 1203 (Step 1205), and if the representation of the password computed in Step 1204 does not match the representation of the password retrieved in Step 1203 a check is made to determine whether there has been a number of consecutive failures that equals a preset number (e.g., a maximum number, of attempts allowed). In an exemplary embodiment this check is effected by evaluating the contents of the Password Attempt field described with reference to FIG. 11.

If the user has not entered the password incorrectly the predetermined number of times, then the user is allowed another chance to enter the correct password. However, if the user has incorrectly entered the password the predetermined number of times, then credentials stored in Step 1018 in the user programmable memory are destroyed (Step 1207) and the mobile communication device 104, 200, 504 halts execution of the authentication/authorization process (Step 1208).

If the password is entered correctly (Step 1205), the mobile communication device 104, 200, 504 computes a temporary password by computing a digital signature of a concatenation of the username, the hardware signature, the "shared secret," the mobile communication device 104, 200, 504 address and a timestamp (Step 1209). The timestamp and hardware signature in some embodiments are obtained from an operating system of the mobile communication device 104, 200, 504. The mobile communication device 104, 200, 504 then transmits the username, the address of the mobile communication device 104, 200, 504 and the temporary key to the trusted server 108, 510 (Step 1210).

The trusted server 108, 510 then receives the temporary key, the address of the mobile communication device 104, 200, 504 and the username from the mobile communication device 104, 200, 504 (Step 1211). The trusted server 108, 510 then computes its own temporary key using information retrieved from the trusted server 108, 510 database (Step 1212). In one embodiment, the trusted server 108, 510 computes the temporary key from a digital signature of the concatenation of the username, the hardware signature, the "shared secret," the mobile communication device 104, 200, 504 address and a timestamp, and in this one embodiment, the hardware signature, the representation of the password and the shared key are retrieved from the trusted server 108, 510 database, and the time stamp is computed to the minute at the trusted server 108, 510. In some embodiments, because respective clocks on the mobile communication device 104, 200, 504 and the trusted server 108, 510 may not be set the same, and in order to account for time variations that may occur between the time the mobile communication device 104, 200, 504 computes its timestamp and the time when the trusted server 108, 510 computes its timestamp, three timestamp are computed at the trusted server 108, 510 29 a second apart and then three temporary passwords are computed.

Advantageously, because the temporary key in the present embodiment includes a timestamp, the temporary key is only good for a few minutes. As a consequence, a party trying to intercept the key would have a worthless key after a few minutes, if they were successful at all. Next, the trusted server 108, 510 compares the temporary key from the mobile communication device 104, 200, 504 with the temporary key computed at the trusted server 108, 510 (Step 1212). If these keys do not match the authentication process is deemed to have failed and it is terminated (Step 1214). Indication of this failure is then passed to the requesting transaction management system 108, 508, which may then act accordingly.

If the temporary key from the mobile communication device 104, 200, 504 matches the temporary key computed at the trusted server 108, 510, the authentication process has validated that the user was in physical possession of their assigned mobile communication device 104, 200, 504 and that they entered the correct password at the mobile communication device 104, 200, 504. Accordingly, the authentication/authorization process is deemed to have been successfully completed (Step 1214). The trusted server 108, 510 then provides an authentication message to the transaction management system 108, 508 so the transaction management system 108, 508 can act accordingly (e.g., carry out a transaction or provide the user with access to resources under the control of, the transaction management system 108, 508). Thus, Steps 1201 through 1214 represent one embodiment of accomplishing Steps 600 through 612 of FIG. 6.

Although the present invention has been described with reference to specific embodiments, it should be recognized that other embodiments are contemplated that are well within the scope of the present invention. For example, aspects of both the initialization process embodiments described with reference to FIGS. 3, 7 and 10 are combinable to form another initialization process according to another embodiment of the present invention.

In addition, aspects of the authentication/authorization procedures described with reference to FIGS. 6, 8, 9 and 12 are combinable to form another authentication/implementation process according to another embodiment of the present invention.

I claim:

1. A method for authenticating a user in a wireless communications system, comprising:
   receiving an address of a wireless communication device at a trusted server, wherein the address identifies the wireless communication device in a communications network;
   locating the address of the wireless communication device among a plurality of addresses in a database, wherein the user is associated with the address in the database;
   establishing, in response to the locating the address, a wireless communication link with the wireless communication device;
   receiving identifying information from the wireless communication device over a communication path including the wireless communication link, wherein the identifying information is produced, at least in part, from shared information stored in a user programmable memory of the wireless communication device and the shared information includes a shared secret generated via a cryptographic key exchange between the wireless communication device and the trusted server; and
   authenticating the user in response to the identifying information.

2. The method of claim 1 wherein the cryptographic key exchange includes a Diffie-Hellman key exchange.

3. The method of claim 1 further comprising sending a digital signature of a quantity incorporating at least a portion of the user information and the shared secret, wherein the digital signature is disposed for comparison to a validation signature generated at the wireless communications device so as to initialize the communications device for use as an authentication device.

4. The method of claim 3 further comprising:
   receiving at the wireless communications device, from the trusted server, a digital signature of a quantity incorporating at least a portion of the user information and the shared secret;
   digitally signing a quantity incorporating at least a portion of the user information and the shared secret stored in the user programmable memory so as to generate a validation signature;
   comparing the digital signature with the validation signature; and
   aborting, in the event the digital signature and the validation signature are different, the initialization of the wireless communication device for use as an authentication device.

5. The method of claim 1, wherein the shared information comprises a representation of a password, wherein the password was provided to the trusted server during an initialization of the wireless communication device.

6. The method of claim 5, wherein the identifying information comprises a digital signature of a combination of the password and a username, wherein the username is associated with the user.

7. The method of claim 5, wherein the shared information comprises a shared secret key produced at both the wireless communication device and the trusted server.

8. The method of claim 7, wherein the identifying information comprises a digital signature of a combination of information, wherein the information includes the shared secret and a timestamp.

9. The method of claim 1, wherein the identifying information is not stored at either the wireless communication device or the trusted server.

10. The method of claim 1, wherein the receiving the address comprises receiving the address of the wireless communication device from a transaction management system, wherein the address is sent from the transaction management system in response to the user requesting access to a resource controlled by the transaction management system, wherein the authenticating comprises sending an authentication to the transaction management system.

11. The method of claim 1, wherein the wireless communication device is a device selected from the group consisting of a cellular telephone and a personal digital assistant (PDA).

12. The method of claim 1, wherein the authenticating comprises sending a communication to a transaction management system indicating the user is authenticated.

13. The method of claim 1 further comprising:
   receiving a request from the user to change information associated with the user within a database of the trusted server; and
   changing the information associated with the user in response to the receiving the request, wherein the authenticating the user in response to the identifying information comprises comparing verification information at the trusted server with the identifying information and wherein the verification information is changed as a result of the changing the information associated with the user.

14. A system for authenticating a user in a wireless communications system, comprising:
   a trusted computer server disposed for communicating with a plurality of wireless communications devices in a communications network including one or more wireless communications links, including:
   one or more processors; and
   one or more memories,
   said one or more memories including instructions for execution on the one or more processors to:
   receive an address of a first wireless communication device of the plurality of wireless communications devices, wherein the address identifies the wireless communication device in a communications network;
   locate the address of the wireless communication device among a plurality of addresses in a database, wherein the user is associated with the address in the database;
   initiate establishment, in response to the locating the address, a wireless communication link with the wireless communication device;
   receive identifying information from the wireless communication device over a communication path including the one or more wireless communication links,
   wherein the identifying information is produced, at least in part, from shared information stored in a user programmable memory of the wireless communication device and the shared information includes a shared secret generated via a cryptographic key exchange between the wireless communication device and the trusted server; and authenticate the user in response to the identifying information.

15. The system of claim 14 wherein the instructions include instructions to provide the cryptographic key exchange with the wireless communications device as a Diffie-Hellman key exchange.

16. The system of claim 14 further including instructions to send a digital signature of a quantity incorporating at least a portion of the user information and the shared secret, wherein the digital signature is disposed for comparison to a validation signature generated at the wireless communications device so as to initialize the communications device for use as an authentication device.

17. The system of claim 14, wherein the shared information comprises a representation of a password, wherein the password was provided to the trusted server during an initialization of the wireless communication device.

18. The system of claim 17, wherein the shared information comprises a digital signature of a combination of the password and a username, wherein the username is associated with the user.

19. The system of claim 17, wherein the shared information comprises a Shared secret key produced at both the wireless communication device and the trusted server.

20. The system of claim 19, wherein the identifying information comprises a digital signature of a combination of information, wherein the information includes the shared secret and a timestamp.

21. The system of claim 14, wherein the identifying information is not stored at the trusted server.

22. The system of claim 14, wherein the instructions to receive the address include instructions to receive the address of the wireless communication device from a transaction management system, wherein the address is sent from the transaction management system in response to the user requesting access to a resource controlled by the transaction management system, and wherein the instructions for authentication comprise instructions to initiate sending an authentication to the transaction management system.

* * * * *